(12) United States Patent
Brisebois et al.

(10) Patent No.: US 11,406,928 B2
(45) Date of Patent: Aug. 9, 2022

(54) DUST COLLECTOR HAVING VERTICAL FILTERS AND A FILTER CARRIAGE

(71) Applicant: AIREAU QUALITE CONTROLE INC., Bois-des-Filion (CA)

(72) Inventors: Martin Brisebois, Sainte-Marie-Salome (CA); Denis Houle, Bois-des-Filion (CA); Michel Sirois, Lorraine (CA)

(73) Assignee: AIREAU QUALITÉ CONTRÔLE INC., Bois-des-Filion (CA)

( * ) Notice: Subject to any disclaimer, the term of this patent is extended or adjusted under 35 U.S.C. 154(b) by 0 days.

(21) Appl. No.: 17/034,510

(22) Filed: Sep. 28, 2020

(65) Prior Publication Data

US 2021/0008481 A1 Jan. 14, 2021

Related U.S. Application Data

(62) Division of application No. 16/108,724, filed on Aug. 22, 2018, now Pat. No. 10,828,592, which is a
(Continued)

(51) Int. Cl.
*B01D 46/00* (2022.01)
*B01D 46/71* (2022.01)
(Continued)

(52) U.S. Cl.
CPC ......... *B01D 46/71* (2022.01); *B01D 46/0043* (2013.01); *B01D 46/023* (2013.01);
(Continued)

(58) Field of Classification Search
CPC ... B01D 46/0005–0009; B01D 46/0019–0021; B01D 46/0043;
(Continued)

(56) References Cited

U.S. PATENT DOCUMENTS

| | | | |
|---|---|---|---|
| 2,035,592 | A | 3/1936 | Christensen |
| 3,480,330 | A | 11/1969 | Hirb et al. |

(Continued)

FOREIGN PATENT DOCUMENTS

| | | |
|---|---|---|
| DE | 29600681 U1 | 4/1996 |
| GB | 863888 A | 3/1961 |

(Continued)

OTHER PUBLICATIONS

European Search Report of EP 20150044 (includes machine translations of foreign references), dated Mar. 2, 2020, Galiana Lopez, Paula.

(Continued)

*Primary Examiner* — T. Bennett McKenzie
(74) *Attorney, Agent, or Firm* — BCF LLP

(57) ABSTRACT

A method for replacing a filter in a dust collector includes: accessing a filter carriage, at least one filter being connected to the filter carriage and being disposed inside a dust collector housing of the dust collector; lowering the filter carriage, the at least one filter being lowered with the filter carriage; translating the filter carriage out of the dust collector housing with the at least one filter; removing the at least one filter from the filter carriage; placing at least one other filter on the filter carriage; translating the filter carriage into the dust collector housing with the at least one other filter; and raising the filter carriage to lock the at least one other filter into an operational location.

6 Claims, 15 Drawing Sheets

Related U.S. Application Data division of application No. 15/816,495, filed on Nov. 17, 2017, now Pat. No. 10,080,989, which is a division of application No. 15/520,648, filed as application No. PCT/IB2015/058169 on Oct. 22, 2015, now Pat. No. 9,849,417.

(60) Provisional application No. 62/067,067, filed on Oct. 22, 2014.

(51) Int. Cl.

| | | |
|---|---|---|
| *B01D 46/24* | (2006.01) | |
| *B01D 46/52* | (2006.01) | |
| *B01D 46/58* | (2022.01) | |
| *B01D 46/88* | (2022.01) | |
| *B01D 50/20* | (2022.01) | |
| *B01D 46/02* | (2006.01) | |
| *B01D 46/48* | (2006.01) | |

(52) U.S. Cl.
CPC .......... *B01D 46/2411* (2013.01); *B01D 46/48* (2013.01); *B01D 46/521* (2013.01); *B01D 46/58* (2022.01); *B01D 46/88* (2022.01); *B01D 50/20* (2022.01); *B01D 2267/60* (2013.01)

(58) Field of Classification Search
CPC .............. B01D 46/008; B01D 46/0023; B01D 46/2411; B01D 46/2414; B01D 46/48; B01D 46/521; B01D 50/002; B01D 2267/60; F24F 13/28
USPC ...... 55/341.1–341.7, 429, 490–519
See application file for complete search history.

(56) References Cited

U.S. PATENT DOCUMENTS

| | | | |
|---|---|---|---|
| 3,535,852 A | 10/1970 | Hirs | |
| 3,535,892 A | 10/1970 | Schmidt et al. | |
| 3,861,893 A | 1/1975 | Smith et al. | |
| 3,867,116 A | 2/1975 | Muller | |
| 3,963,467 A | 6/1976 | Rolschau | |
| 4,198,221 A * | 4/1980 | Catlin ................ B01D 46/0094 55/502 |
| 4,243,397 A | 1/1981 | Tokar et al. | |
| 4,247,315 A * | 1/1981 | Neumann .......... B01D 46/0043 55/484 |
| 4,264,345 A | 4/1981 | Miller | |
| 4,278,454 A | 7/1981 | Nemesi | |
| 4,322,231 A * | 3/1982 | Hilzendeger ...... B01D 46/0005 55/357 |
| 4,323,376 A * | 4/1982 | Rosenquest ............ B01D 46/02 55/304 |
| 4,395,269 A | 7/1983 | Schuler | |
| 4,433,987 A | 2/1984 | Lenox | |
| 4,435,197 A * | 3/1984 | Nijhawan .......... B01D 46/0006 55/341.7 |
| 4,632,681 A * | 12/1986 | Brunner ............. B01D 46/0005 55/341.1 |
| 4,820,320 A | 4/1989 | Cox | |
| 4,883,509 A | 11/1989 | Giusti et al. | |
| 4,919,801 A | 4/1990 | Hobson | |
| 4,955,996 A | 9/1990 | Edwards et al. | |
| 5,223,008 A * | 6/1993 | Troxell ................ B01D 46/002 55/350.1 |
| 5,409,515 A | 4/1995 | Yamamoto et al. | |
| 5,746,796 A * | 5/1998 | Ambs ................ B01D 46/0005 55/480 |
| 5,961,675 A | 10/1999 | Son et al. | |
| 5,961,696 A * | 10/1999 | Gombos ............ B01D 46/0005 55/493 |
| 6,073,905 A | 6/2000 | Wilson | |
| 6,214,077 B1 * | 4/2001 | Bitner ................ B01D 46/0005 55/490 |
| 6,290,752 B1 | 9/2001 | Koller et al. | |
| 6,364,921 B1 | 4/2002 | Raether et al. | |
| 6,444,005 B1 | 9/2002 | Bitner | |
| 6,544,317 B2 | 4/2003 | Miller | |
| 6,551,368 B1 | 4/2003 | Kordas | |
| 6,942,711 B2 | 9/2005 | Faulkner et al. | |
| 6,974,491 B1 * | 12/2005 | Kendall ............. B01D 46/0005 55/302 |
| 7,182,799 B2 | 2/2007 | Dries | |
| 7,300,481 B2 | 11/2007 | Scheuch | |
| 7,404,833 B2 | 7/2008 | Lee | |
| 7,563,295 B2 | 7/2009 | Andersen | |
| 7,918,907 B2 | 4/2011 | Bitner | |
| 7,918,908 B2 | 4/2011 | Nahey et al. | |
| 8,097,052 B2 | 1/2012 | Porter et al. | |
| 8,551,204 B2 | 10/2013 | Yokohama et al. | |
| 8,679,213 B2 | 3/2014 | Lu et al. | |
| 8,715,399 B2 | 5/2014 | Buzanowski | |
| 10,821,391 B2 * | 11/2020 | Silvestro .............. B01D 46/002 |
| 2002/0020116 A1 | 2/2002 | Moore | |
| 2002/0020160 A1 * | 2/2002 | Moore ............... B01D 46/0005 55/484 |
| 2003/0200733 A1 | 10/2003 | Jung | |
| 2006/0174768 A1 * | 8/2006 | Taylor ...................... B03C 3/41 96/59 |
| 2006/0207230 A1 | 9/2006 | Demarco | |
| 2007/0039290 A1 | 2/2007 | Lee | |
| 2009/0113858 A1 | 5/2009 | Macliver et al. | |
| 2010/0058721 A1 * | 3/2010 | Wu ........................ B01D 46/02 55/379 |
| 2012/0073434 A1 * | 3/2012 | Doehla .................. B01D 46/02 95/19 |
| 2013/0091811 A1 * | 4/2013 | Morgan ............. B01D 46/0005 55/341.1 |
| 2014/0096496 A1 | 4/2014 | Raether et al. | |
| 2014/0245704 A1 | 9/2014 | Raether | |
| 2016/0088990 A1 * | 3/2016 | Anderson .............. B01D 45/08 55/429 |
| 2016/0375392 A1 * | 12/2016 | Novosel ............ B01D 46/0005 55/493 |
| 2017/0212357 A1 * | 7/2017 | Reid .................... G02B 27/141 |

FOREIGN PATENT DOCUMENTS

| | | |
|---|---|---|
| GB | 1485705 | 12/1976 |
| JP | S58112425 U | 8/1983 |
| WO | 2009041493 A1 | 4/2009 |

OTHER PUBLICATIONS

Camfil, Farr Gold Series, Gold Cone Filters, Copyright 2014 Camfil APC.
Amtechlc ATV Series Dust Collectors, www.amtechlc.com.
"Falcon Equipment: CMS Dust Collector" http://falcon-equipment.ca/ http://falcon-equipment.ca/2013/02/cms-dust-collectors/ (Accessed Jul. 14, 2014).
"Industrial Dust Collectors: News and Information—What Is a Gold Cone?" www.industrialdustcollectors.blogspot.com http://industrialdustcollectors.blogspot.com/2009_07_01_archive.html, retrieved on Apr. 11, 2017.
International search report from PCT/IB2015/058169, Guillaume White-Rolland, dated Jan. 7, 2016.

* cited by examiner

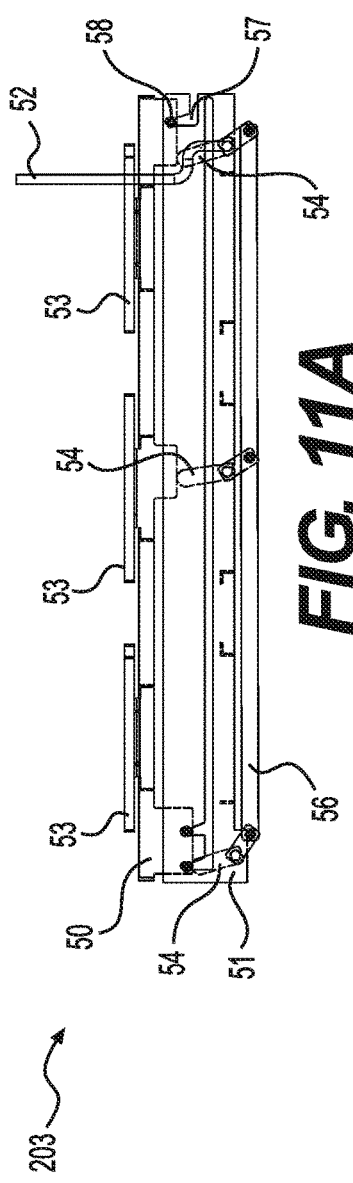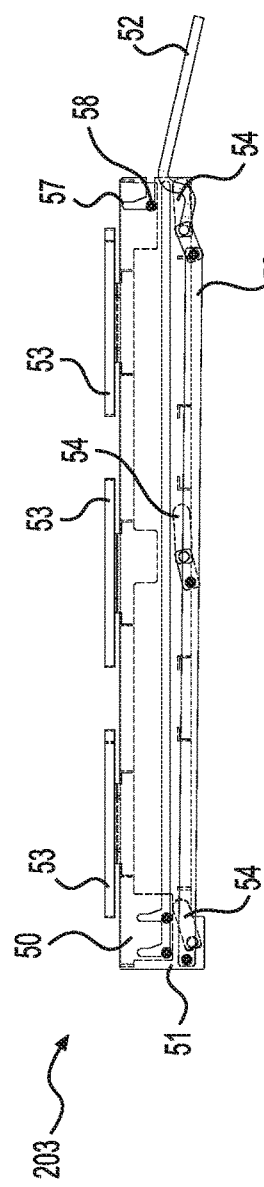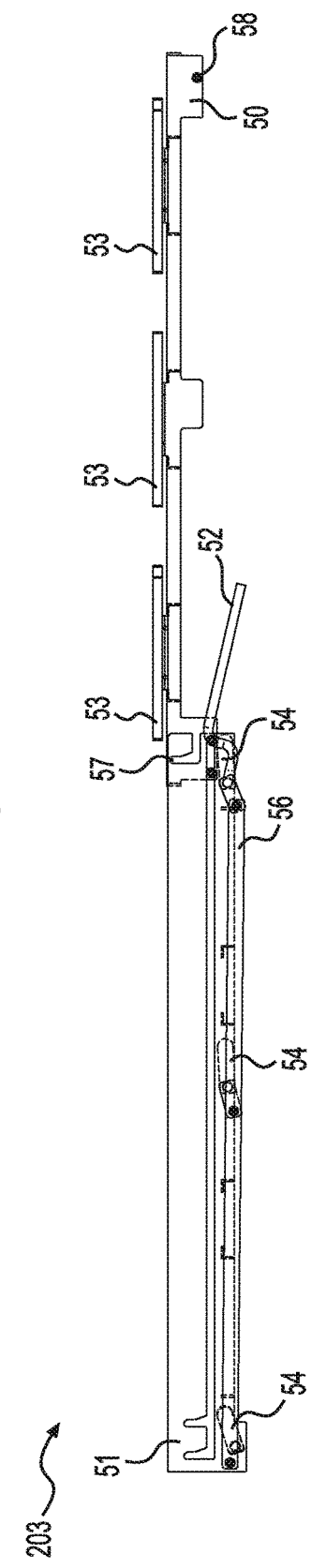

DUST COLLECTOR HAVING VERTICAL FILTERS AND A FILTER CARRIAGE

CROSS-REFERENCE

The present application is a divisional application of U.S. patent application Ser. No. 16/108,724, filed on Aug. 22, 2018. U.S. patent application Ser. No. 16/108,724 is a divisional application of U.S. patent application Ser. No. 15/816,495, filed on Nov. 17, 2017, which issued as U.S. Pat. No. 10,080,989 on Sep. 25, 2018. U.S. patent application Ser. No. 15/816,495 is a divisional of U.S. patent application Ser. No. 15/520,648, filed on Apr. 20, 2017, which issued as U.S. Pat. No. 9,849,417 on Dec. 26, 2017. U.S. patent application Ser. No. 15/520,648 is a National Phase Entry of International Patent Application PCT/IB2015/058169, filed on Oct. 22, 2015. Through International Patent Application PCT/IB2015/058169, the present application claims priority to U.S. Provisional Patent Application No. 62/067,067 filed on Oct. 22, 2014. The entirety of the above applications is incorporated herein by reference.

FIELD OF TECHNOLOGY

The present technology relates to the field of dust collectors.

BACKGROUND

Dust collectors are used in a wide variety of industries to control particles and pollutants, including power plants, steel mills and pharmaceutical and chemical production facilities. These apparatuses take in air laden with dust or pollutant particles and produce a filtered air stream by forcing the air through filters. The filters used in this type of air filter device include woven fabric filter bags, unwoven felt filter bags and filter cartridges.

In normal operation, the filters used in dust collectors will need to be replaced regularly. The replacement of the filters can be a time consuming process. In order to replace the filters, the dust collector must be shut down. In this case, the dust and pollutant producing process must also be stopped, or another dust collector apparatus must be run in replacement. Both solutions entail costs to the facility, either in the form of additional costs of maintaining supplemental dust collectors or in decreased production when the facilities must be shut down for the filter replacement.

In addition, the different filters in a dust collector may need to be cleaned or replaced at different rates, depending on their positions in the dust collector, thus creating a complicated replacement schedule for the various filters. For example, filters nearer an air inlet may get dirtier faster than filters farther from the air inlet, leading to a higher frequency of changing or cleaning the closer filters than the farther filters. Further complicating matters, the dust to be filtered out of the air may be of various particle sizes, and may be dry or moist depending on the facilities in which it is being used. Moist dust particles can cake onto the filter surfaces, causing an increase in the frequency of replacement necessary for the filters, especially those nearer the intake.

SUMMARY

It is an object of the present invention to ameliorate at least some of the inconveniences present in the prior art.

According to a first broad aspect of the present technology, there is provided dust collector comprising a housing including an upper wall, at least one housing wall connected to the upper wall, the at least one housing wall defining an inlet, and one of the upper wall and the at least one housing wall defining an outlet; a separating plate connected to the housing above the inlet and below the outlet, the separating plate defining at least one aperture; and at least one vertically extending filter connected to and extending below the separating plate, the at least one vertically extending filter fluidly communicating with the at least one aperture, a center line of the inlet extending above a top portion of the at least one vertically extending filter.

In some implementations of the present technology, the top portion of the at least one vertically extending filter is disposed at or below a bottom portion of the inlet.

In some implementations of the present technology, the dust collector further comprises at least one pipe connecting the at least one vertically extending filter to the separating plate, the at least one pipe extending below the separating plate.

In some implementations of the present technology, the dust collector further comprises at least one sealing ring being disposed between a top portion of the at least one vertically extending filter and a bottom portion of the at least one pipe.

In some implementations of the present technology, a top portion of the at least one pipe passes through the at least one aperture and extends above the separating plate.

In some implementations of the present technology, the dust collector further comprises at least one expandable sleeve surrounding the at least one pipe, the at least one pipe defining at least one side aperture fluidly communicating an interior of the at least one pipe with a space between the at least one pipe and at least one expandable sleeve and an air injector system fluidly communicating with the at least one aperture for injecting air into the space through the at least one aperture to expand the sleeve.

In some implementations of the present technology, the inlet is arranged substantially opposite the outlet.

In some implementations of the present technology, the inlet and the outlet are arranged at substantially a same height.

In some implementations of the present technology, the separating plate is arranged diagonally within the housing, the separating plate extending downward as the separating plate extends away from the inlet.

In some implementations of the present technology, the at least one housing wall includes a front wall connected to the upper wall, the front wall defining the inlet; a back wall connected to the upper wall and being opposite the front wall, the back wall defining the outlet and two side walls connected to and extending between the front wall and the back wall, the side walls being connected to the upper wall.

In some implementations of the present technology, the dust collector further comprises a dust collection unit connected to a bottom portion of the at least one housing wall; and a dust collection unit opening in a lower portion of the dust collection unit.

In some implementations of the present technology, the dust collector further comprises an air injection system, the air injection system including at least one air injection nozzle being aligned with the at least one aperture for supplying compressed air inside the at least one vertically extending filter and a compressed air reservoir for delivering air to the at least one air injection nozzle.

In some implementations of the present technology, air laden with dust particles enters via the inlet; the air laden with dust particles flows generally vertically downward from the inlet; the air passes through the at least one vertically extending filter and then through the at least one aperture in the separating plate; the dust particles gather on the at least one vertically extending filter or fall into a dust collection unit connected to a bottom portion of the at least one housing wall; and from the at least one aperture, the air exits the housing of the dust collector via the outlet.

In some implementations of the present technology, the at least one aperture includes a first row of first apertures, a second row of second apertures, and the first row and the second row are substantially parallel, the first apertures are staggered with respect to the second apertures; and wherein the at least one vertically extending filter is a plurality of vertically extending filters, each of the plurality of filters fluidly communicates with a corresponding one of the first and second apertures.

In some implementations of the present technology, the first row and the second row are substantially orthogonal to a direction of air flow entering the dust collector via the inlet.

In some implementations of the present technology, the dust collector further comprises a plurality of pipes connecting the plurality of vertically extended filters to the separating plate, the plurality of pipes extending below the separating plate, the plurality of pipes fluidly communicating with a corresponding one of the first and second apertures; and wherein air laden with dust particles enters via the inlet, the air laden with dust particles flows generally vertically downward from the inlet, the air laden with dust particles impacts on at least one of the plurality of pipes due to a staggered configuration of the plurality of pipes, the air passes through at least one of the plurality of vertically extending filters and then through at least one of the first and second apertures in the separating plate, the dust particles gather on the at least one of the plurality of vertically extending filters or fall into a dust collection unit connected to a bottom portion of the at least one housing wall, and from the at least one of the first and second apertures, the air exits the housing of the dust collector via the outlet.

According to another broad aspect of the present technology, there is provided a removable filter system for a dust collector, comprising a carriage base; a filter carriage being movably connected to the carriage base; at least one filter support connected to a top portion of the filter carriage; at least one filter removably connected to the filter carriage by the at least one filter support; the filter carriage being movable between at least a first position, a second position and a third position relative to the carriage base: in the first position the filter carriage positions the at least one filter in an operational location in the dust collector, in the second position the filter carriage positions the at least one filter vertically lower with respect to the carriage base, the at least one filter being inside the dust collector, and in the third position the filter carriage and the at least one filter being outside the dust collector.

According to yet another broad aspect of the present technology, there is provided a method for replacing a filter in a dust collector, the method including accessing a filter carriage, at least one filter being connected to the filter carriage and being disposed inside a dust collector housing of the dust collector; lowering the filter carriage, the at least one filter being lowered with the filter carriage; translating the filter carriage out of the dust collector housing with the at least one filter; removing the at least one filter from the filter carriage; placing at least one other filter on the filter carriage; translating the filter carriage into the dust collector housing with the at least one other filter; and raising the filter carriage to lock the at least one other filter into an operational location.

According to yet another broad aspect of the present technology, there is provided a dust collector comprising a plate defining at least one aperture; at least one housing wall connected to the plate, the at least one housing wall defining an inlet; an access door disposed in the at least one housing wall; at least one vertically extending filter, a top portion of the at least one vertically extending filter being connected to and extending below the plate, the at least one vertically extending filter fluidly communicating with the at least one aperture; at least one carriage base; at least one filter carriage being movably connected to the at least one carriage base; at least one filter support connected to a top portion of the at least one filter carriage; the at least one vertically extending filter being connected to the at least one filter carriage by the at least one filter support; the at least one filter carriage being movable between at least a first position, a second position and a third position relative to the carriage base: in the first position, the at least one filter carriage positions the at least one vertically extending filter in an operational location in the dust collector, in the second position, the at least one filter carriage positions the at least one vertically extending filter vertically lower with respect to the at least one carriage base, the at least one filter being inside the dust collector, and in the third position, the at least one filter carriage and the at least one vertically extending filter being outside the dust collector.

In some implementations of the present technology, the at least one housing wall further defines an outlet, and the inlet and the outlet are arranged at substantially a same height.

In some implementations of the present technology, the plate is arranged diagonally within the housing, the separating plate extending downward as the separating plate extends away from the inlet.

In some implementations of the present technology, air laden with dust particles enters via the inlet; the air laden with dust particles flows into the dust collector from the inlet; the air passes through the at least one vertically extending filter and then through the at least one aperture in the plate; the dust particles gather on the at least one vertically extending filter or fall into a dust collection unit connected to a bottom portion of the at least one housing wall; and from the at least one aperture, the air exits the housing of the dust collector via an outlet.

In some implementations of the present technology, the dust collector further comprises at least one pipe connecting the at least one vertically extending filter to the plate, the at least one pipe extending below the plate.

In some implementations of the present technology, the dust collector further comprises at least one sealing ring being disposed between a top portion of the at least one vertically extending filter and a bottom portion of the at least one pipe.

In some implementations of the present technology, a top portion of the at least one pipe passes through the at least one aperture and extends above the separating plate.

In some implementations of the present technology, the dust collector further comprises at least one expandable sleeve surrounding the at least one pipe; the at least one pipe defining at least one side aperture fluidly communicating an interior of the at least one pipe with a space between the at least one pipe and at least one expandable sleeve; and an air injector system fluidly communicating with the at least one aperture for injecting air into the space through the at least one aperture to expand the sleeve.

According to yet another broad aspect of the present technology, there is provided a dust collector including a housing including an upper wall, at least one housing wall connected to the upper wall, the at least one housing wall defining an inlet, and one of the upper wall and the at least one housing wall defining an outlet; a separating plate connected to the housing above the inlet and below the outlet, the separating plate defining at least one aperture; at least one vertically extending filter connected to and extending below the separating plate, the at least one vertically extending filter fluidly communicating with the at least one aperture, a center line of the inlet extending above a top portion of the at least one vertically extending filter; at least one pipe connecting the at least one vertically extending filter to the separating plate, the at least one pipe extending below the separating plate; at least one expandable sleeve surrounding the at least one pipe, the at least one pipe defining at least one side aperture fluidly communicating an interior of the at least one pipe with a space between the at least one pipe and the at least one expandable sleeve; and an air injector system fluidly communicating with the at least one aperture for injecting air into the space through the at least one aperture to expand the sleeve.

In some implementations of the present technology, the top portion of the at least one vertically extending filter is disposed at or below a bottom portion of the inlet.

In some implementations of the present technology, the dust collector further includes at least one sealing ring being disposed between a top portion of the at least one vertically extending filter and a bottom portion of the at least one pipe.

In some implementations of the present technology, a top portion of the at least one pipe passes through the at least one aperture and extends above the separating plate.

In some implementations of the present technology, the inlet is arranged substantially opposite the outlet.

In some implementations of the present technology, the inlet and the outlet are arranged at substantially a same height.

In some implementations of the present technology, the separating plate is arranged diagonally within the housing, the separating plate extending downward as the separating plate extends away from the inlet.

In some implementations of the present technology, the at least one housing wall includes: a front wall connected to the upper wall, the front wall defining the inlet; a back wall connected to the upper wall and being opposite the front wall, the back wall defining the outlet; and two side walls connected to and extending between the front wall and the back wall, the side walls being connected to the upper wall.

In some implementations of the present technology, the air injection system includes: at least one air injection nozzle being aligned with the at least one aperture, the at least one air nozzle being adapted for supplying compressed air inside the at least one vertically extending filter via the at least one aperture; and a compressed air reservoir for delivering air to the at least one air injection nozzle.

In some implementations of the present technology, the dust collector further includes a dust collection unit connected to a bottom portion of the at least one housing wall; and a dust collection unit opening in a lower portion of the dust collection unit.

In some implementations of the present technology, air laden with dust particles enters via the inlet; the air laden with dust particles flows generally vertically downward from the inlet; the air passes through the at least one vertically extending filter and then through the at least one aperture in the separating plate; the dust particles gather on the at least one vertically extending filter or fall into the dust collection unit connected to the bottom portion of the at least one housing wall; and from the at least one aperture, the air exits the housing of the dust collector via the outlet.

In some implementations of the present technology, the at least one aperture includes: a first row of first apertures, a second row of second apertures, and the first row and the second row are substantially parallel, the first apertures are staggered with respect to the second apertures; and the at least one vertically extending filter is a plurality of vertically extending filters, each of the plurality of filters fluidly communicates with a corresponding one of the first and second apertures.

For purposes of this application, terms related to spatial orientation are defined with respect to the standard operational orientation of the dust collector. Specifically, vertical is meant to represent a direction generally orthogonal to the ground upon which the apparatus rests when oriented in its standard operational orientation.

Implementations of the present technology each have at least one of the above-mentioned object and/or aspects, but do not necessarily have all of them. It should be understood that some aspects of the present invention that have resulted from attempting to attain the above-mentioned object may not satisfy this object and/or may satisfy other objects not specifically recited herein.

Should there be contradictions between the definitions of terms provided in documents incorporated herein by reference and definitions of such terms provided in the present application, the definitions in the present application prevail.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 11A is an isolated, cross-sectional view of the removable filter system in an operational position;

FIG. 11B is an isolated, cross-sectional view of the removable filter system in a lowered position;

FIG. 11C is an isolated, cross-sectional view of the removable filter system in an extended position;

DETAILED DESCRIPTION

Figure 1:
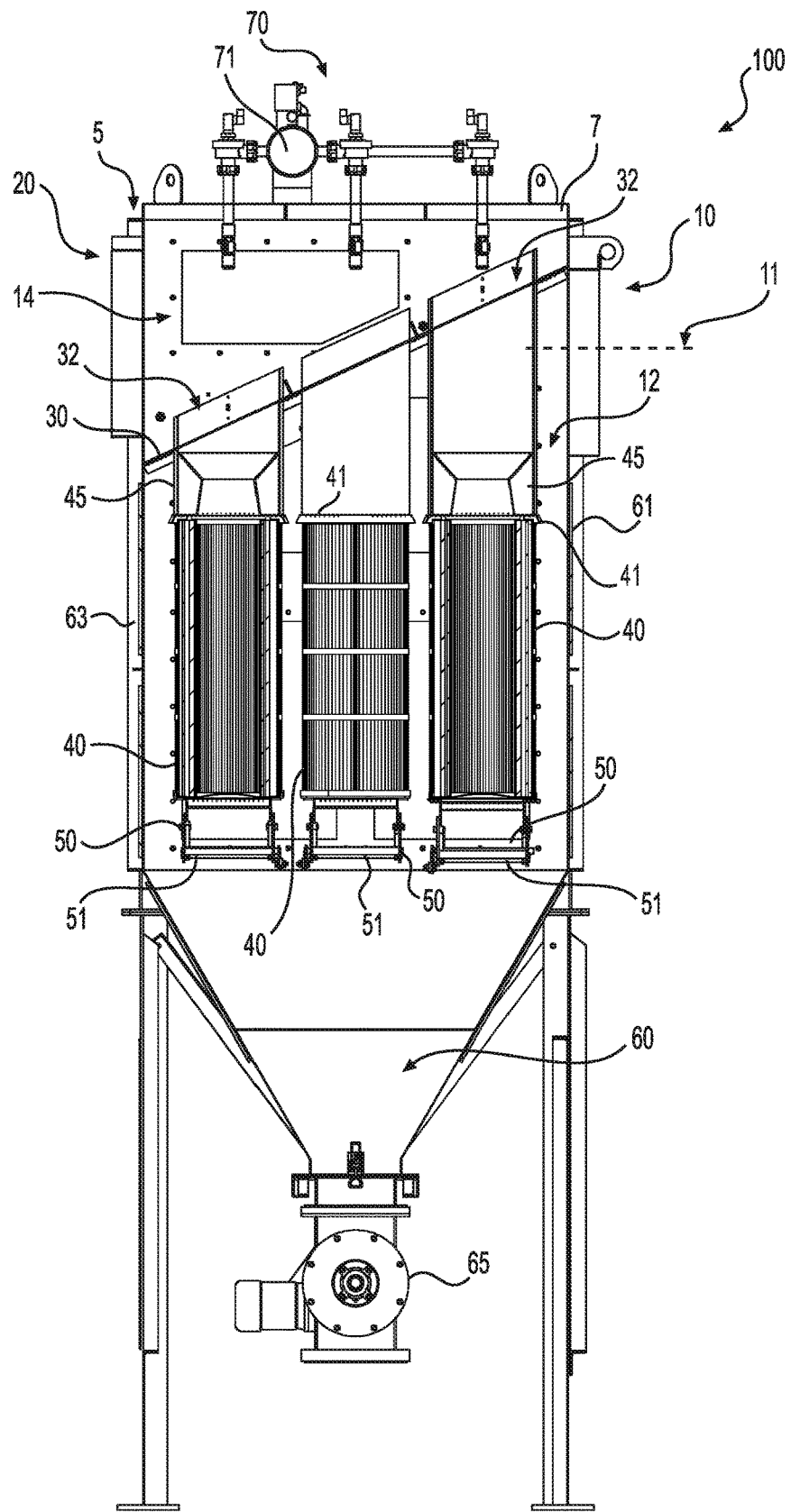
FIG. 1 illustrates a cross-sectional view of a dust collector, according to an implementation of the present technology.

The present detailed description is intended to be only a description of illustrative examples of the present technology. The following description relates to ways of manufacturing and designing a dust collector and a removable filter system for a dust collector. Other ways of manufacturing and designing a dust collector and a removable filter system for a dust collector are contemplated and this technology would encompass these other known ways and designs.

A dust collector 100 according to an implementation of the present technology will be described with respect to FIGS. 1 to 7.

The dust collector 100 has a housing 5 surrounding the inner constituents. The housing 5 has an inlet 10 defined by a front wall 61 to allow air laden with dust particles to enter the dust collector 100 into an intake chamber 12 and an outlet 20 defined by a back wall 63 to allow filtered air to exit the dust collector 100 from an exhaust chamber 14. Two side walls 62 extending between and connecting to the front wall 61 and the back wall 63 complete the top portion of the housing 5, along with an upper wall 7 connected to the top of the four walls 61, 62, 62, and 63. In one of the side walls 62, there is an access door 55 allowing operator access to the interior of the housing 5. It is contemplated that the housing 5 could be of any shape and be composed of any number of walls, including one vertical wall in a cylindrical shape attached to the upper wall 7.

A dust collection unit 60 is connected to the bottom of the housing 5. There is a dust collection unit opening 65 in the bottom portion of the dust collection unit 60 so that dust that has been collected can be removed from the dust collector 100. In this implementation, the dust collection unit 60 is in the form of a funnel shaped hopper, though other forms are contemplated by the present technology.

In this implementation, the inlet 10 and the outlet 20 are arranged on opposite walls and at substantially the same height, as is best seen in FIG. 1. It is contemplated that in other implementations that the inlet 10 and outlet 20 could be on neighboring walls, or on the upper wall 7 and at various relative heights. Similarly the access door 55 is not restricted to a side wall 62, and may be located on any wall desired for a given implementation, or may be omitted entirely.

Figure 5:
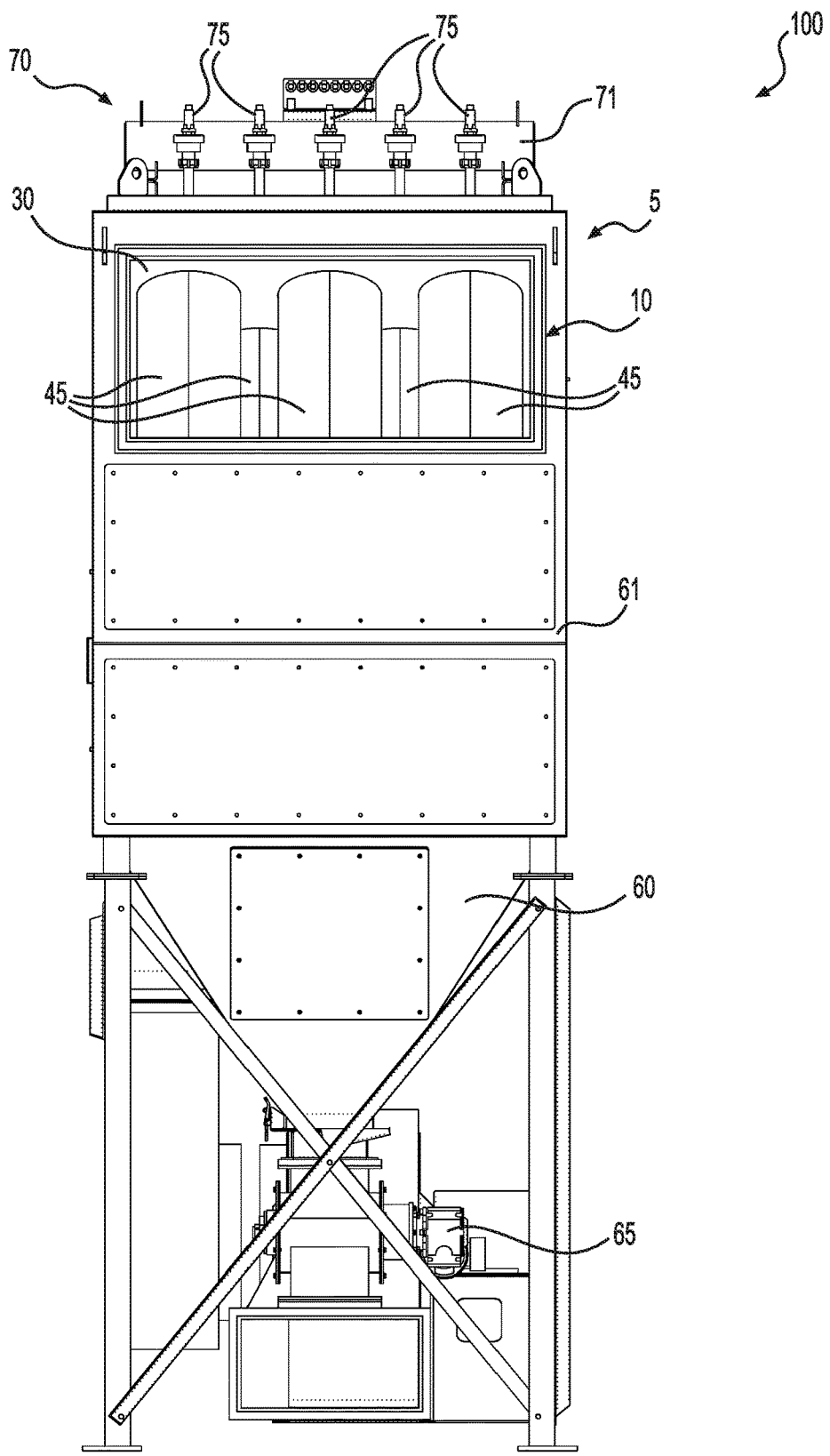
FIG. 5 is a view of an inlet side of the dust collector of FIG. 1.
Figure 6:
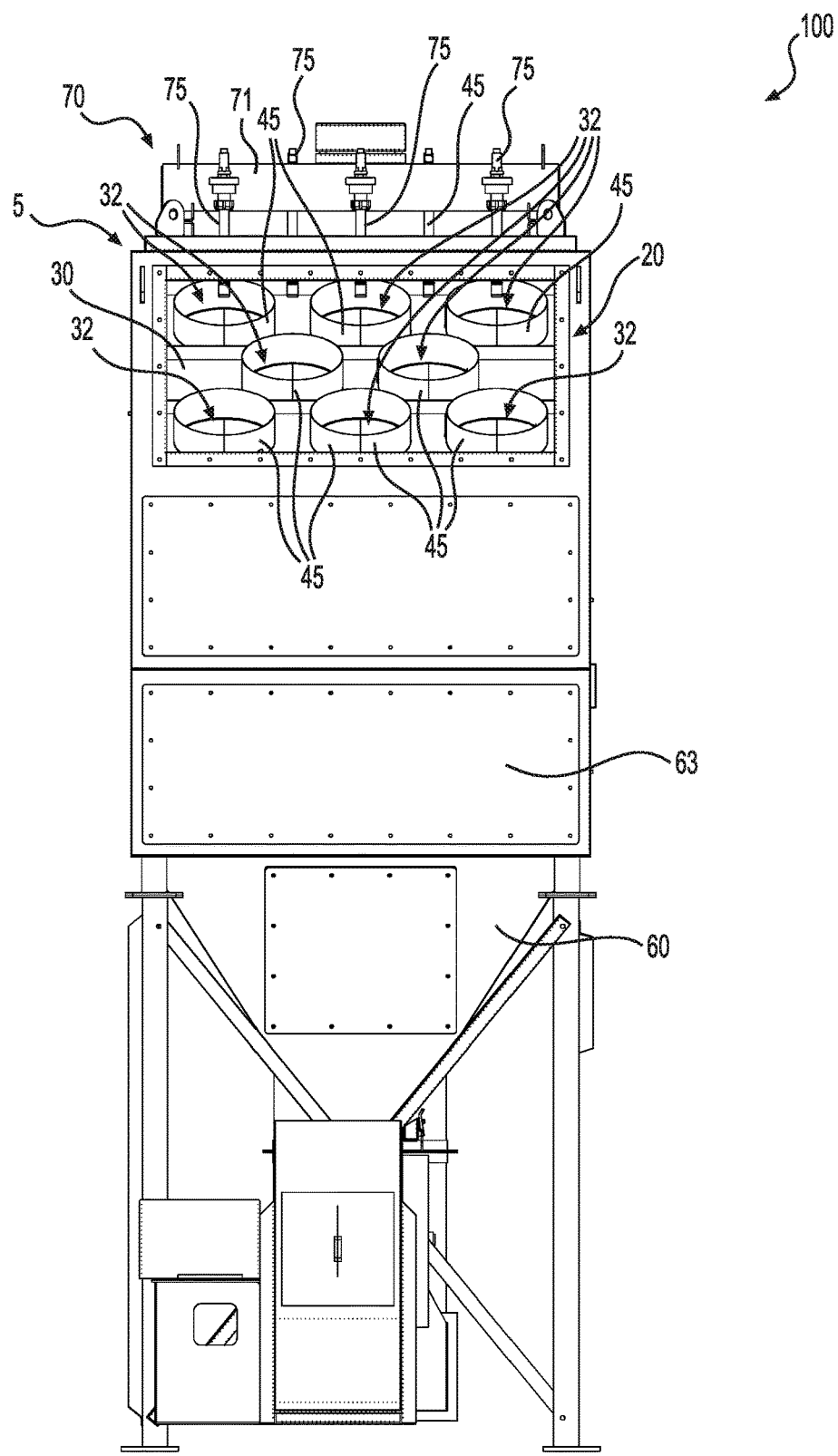
FIG. 6 is a view of an outlet side of the dust collector of FIG. 1.

The inlet 10 is rectangular, as best seen in FIG. 5, but this is a single example of the size and form possible. It is contemplated that the inlet 10 could be of any shape and size that retains the functionality of allowing an adequate air flow into the intake chamber 12 within the dust collector housing 5. As best seen in FIG. 6, the outlet 20 is also rectangular but may be of any size or shape that allows for adequate flow of filtered air out of the exhaust chamber 14.

Inside the housing 5 of the dust collector 100, there is a separating plate 30 secured to the interior of the housing 5 for separating the intake chamber 12 from the exhaust chamber 14. The separating plate 30 is connected above the inlet 10 on the front wall 61 and below the outlet 20 on the back wall 63. Because the inlet 10 and the outlet 20 are at substantially the same height and arranged on opposite walls, the separating plate 30 extends diagonally across the interior of the housing 5 and creates an angled separation between the intake chamber 12 and the exhaust chamber 14. The specific angle at which the separating plate 30 is arranged will vary by implementation. It is contemplated that it may range from horizontal up to nearly vertical, depending on the application and the dimensions of the housing 5.

In the separating plate 30, there are eight round apertures 32 to provide a conduit between the two chambers 12, 14. It is contemplated that more or less than eight, including a single aperture 32 may be used. The size and shape of the apertures 32 is also not restricted to the circular form of the current implementation and it is contemplated that the size and shape may vary with different implementations.

Attached to and passing though the apertures 32 are an equal number of generally cylindrical pipes 45. The top portion of each pipe 45 extends past the separating plate 30 into the exhaust chamber 14. The top edge of each pipe 45 is angled to be substantially parallel to the separating plate 30, giving each aperture 32 a direct line of sight with the outlet 20, as is best seen in FIG. 6. It is contemplated that the angle and shape of the portion of the pipes 45 passing the separating plate 30 could vary. It is also contemplated that the pipes 45 could end flush with the separating plate 30 in different implementations.

The pipes 45 attached to and extending through the separating plate 30 also extend down into the intake chamber 12. The bottom portion of each pipe 45 is flared outward. The size and shape of the pipes 45 is also not restricted to the cylindrical form of the current implementation and it is contemplated that the size and shape may vary with different implementations, including to be matched to the size and shape of the aperture 32 in a given implementation.

In the bottom flared portion of each pipe 45 a vertically extending filter 40 is connected. A sealing ring 44 is positioned on each filter 40 to be pressed between each pipe 45 and each filter 40, to create a seal between the two when the pipe 45 and the filter 40 are connected together in an operational position. It is contemplated that the sealing ring 44 may alternatively be connected to the pipe 45, or that the sealing ring 44 be omitted and another mechanism may be used to prevent air flow from the intake chamber 12 into the pipe 45. Because the separating plate 30 is arranged such that it is diagonal across the interior of the housing 5, the pipes 45 nearer the inlet 10 are longer than the pipes nearer the outlet 20 such that the filters 40 are all the same length.

Figure 4:
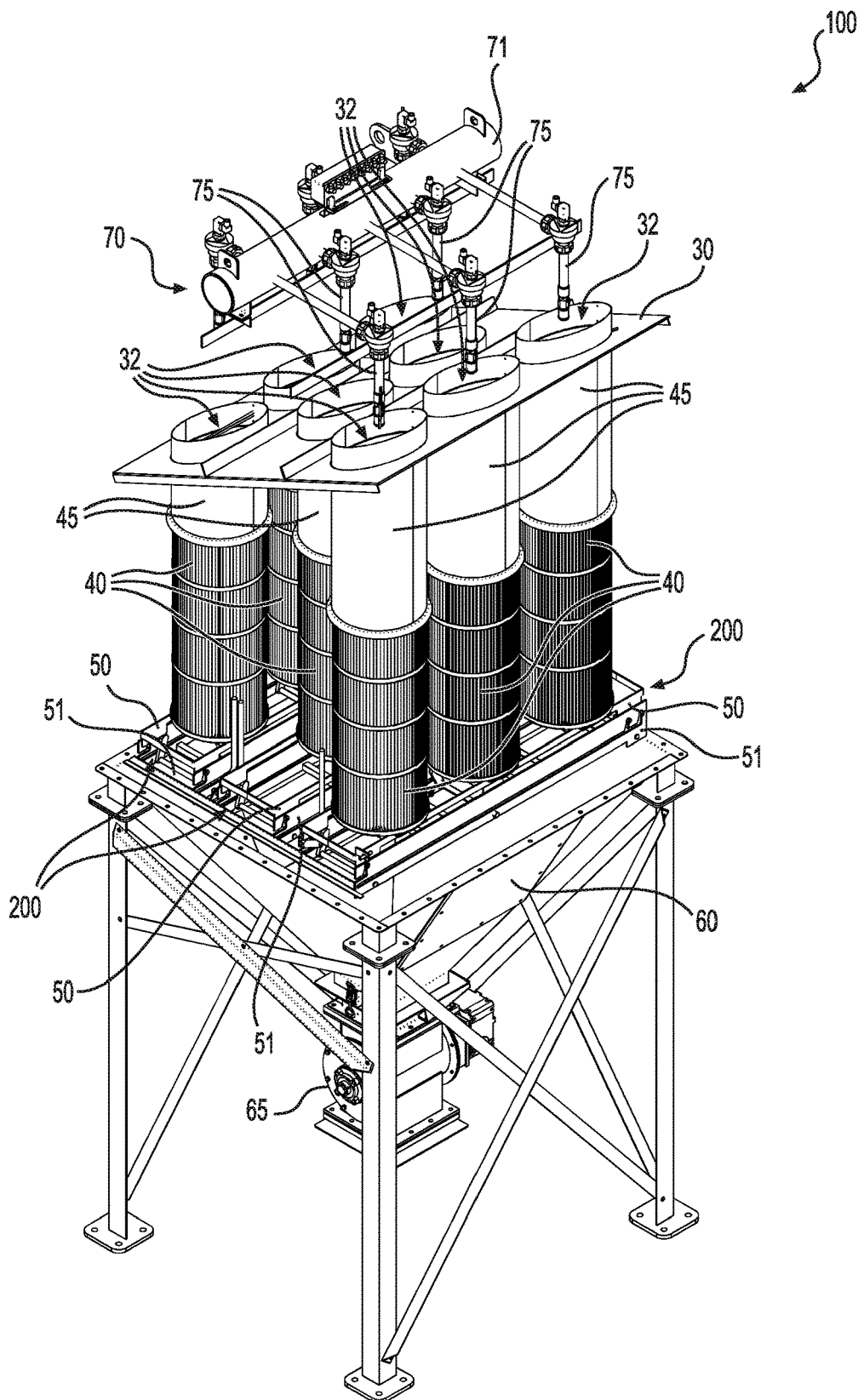
FIG. 4 is a perspective view of the dust collector of FIG. 1, with the housing removed.

A vertically extending filter 40 is a filtering device which allows the passage of air through and traps dust particles in its side surfaces. These side surfaces are vertically oriented and generally orthogonal to the ground upon which the dust collector 100 is placed, as best seen in FIG. 4. The filtering device is made of a pleated fibrous material arranged to form a cylinder in the implementation shown, as represented by the repeating lines on the filters 40 in FIGS. 1 and 4. The opening allowing the filtered air to exit from the center of the vertically extending filter 40 is located at the top of each filter 40, which allows the filtered air to pass into the corresponding pipe 45. It is contemplated that any filter 40 with a filtering surface extending vertically with an opening at the top could be compatible with the present technology, including but not limited to: pleated nonwoven cartridges, cylindrical woven fabric bag filters and cylindrical felted fabric bag filters.

While in this implementation, pipes 45 are used to operationally connect the filters 40 to the separating plate 30, it is contemplated that in other implementations, different methods could be used. In some implementations, the pipes 45 could be omitted and the filters 40 could abut the separating plate 30 at the apertures 32 directly. It is contemplated that dust collector 100 could also be designed to use filters 40 of various sizes and the lengths and that the pipes 45 would be reconfigured to accommodate those filters 40.

The lengths of the pipes 45 connecting the filters 40 to the separating plate 30 are selected such that a center line 11 of the inlet 10 extends above tops of the filters 40. In this implementation, the top portions 41 of the filters 40 are at or below the inlet 10. This provides a surface for incoming air laden with dust particles entering from the inlet 10 to impact, specifically the pipes 45, rather than arriving incident directly on the filters 40. This aids in avoiding the problem of saturating the filters 40 with dust that might otherwise fall into the dust collection unit 60. For the case of moist dust being carried by the air, initial incidence on the pipes 45 instead of the filters 40 prevents caking of the wet dust on the filters. By impacting on the pipes 45 first, some dust particles fall down into the dust collection unit 60 or become caked on the surface of pipe 45. In either case, there is less dust on the filters 40, which extends the lifetime between cleanings or replacement of the filters 40. This is best seen in FIG. 5, where the filters 45 are not visible directly in line with the inlet 10.

Figure 7:
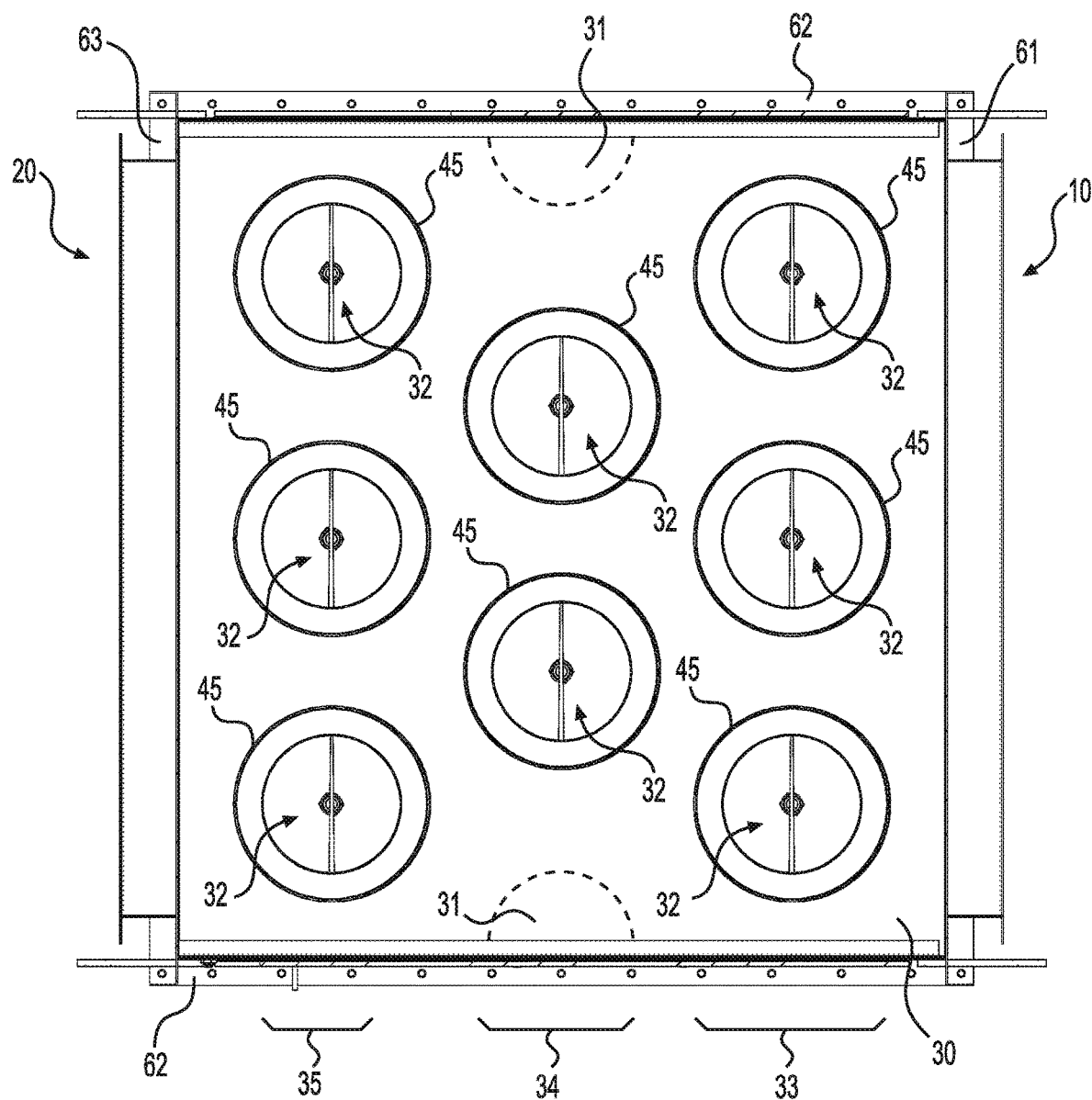
FIG. 7 is a top plan view of the dust collector of FIG. 1 with the upper wall and air injection system removed.

In FIG. 7, the arrangement of the eight apertures 32 in the separating plate 30 of the dust collector 100 is illustrated. As air flows through the dust collector 100 (as described below), some air flowing into the intake chamber 12 will encounter a first row 33 of three pipes 45 associated with the first row 33 of the three apertures 32 and be directed downward or around those pipes 45. Some air will pass between the pipes 45 of the first row 33, but it will encounter the two pipes 45 of a second row 34, due to the staggered arrangement between the first 33 and second 34 rows of apertures 32 and their corresponding pipes 45. In this implementation, there is a third row 35 of three apertures 32 staggered with respect to the second row 34 as well, which will intercept air that has been diverted by the first two rows 33, 34 but is still flowing toward the back wall 63.

This staggered arrangement of the inlet 10, the separating plate 30, the apertures 32 and the pipes 45 prevents the direct flow of incoming air toward the back wall 63, which aids in a more even distribution of air flow within the housing 5. A more even air flow through the interior of the dust collector 100 more evenly distributes the filtering done by the filters 40, decreasing the difference in frequency at which various filters 40 need to be cleaned or replaced. In some implementations, additional impediments 31, shown in dashed lines in FIG. 7, may be added to disrupt the air flow along the side walls 62. Here two impediments 31 may be added to row 34, where there are only two apertures 32 and two pipes 45 to intercept the air flowing around the three apertures 32 and pipes 45 of row 33.

It is contemplated that the separating plate 30 may contain more or less than three rows of apertures 32, and each row may be composed of more or less than three apertures 32. The exact pattern of staggering between the rows may also vary for differing implementations.

Figure 2:
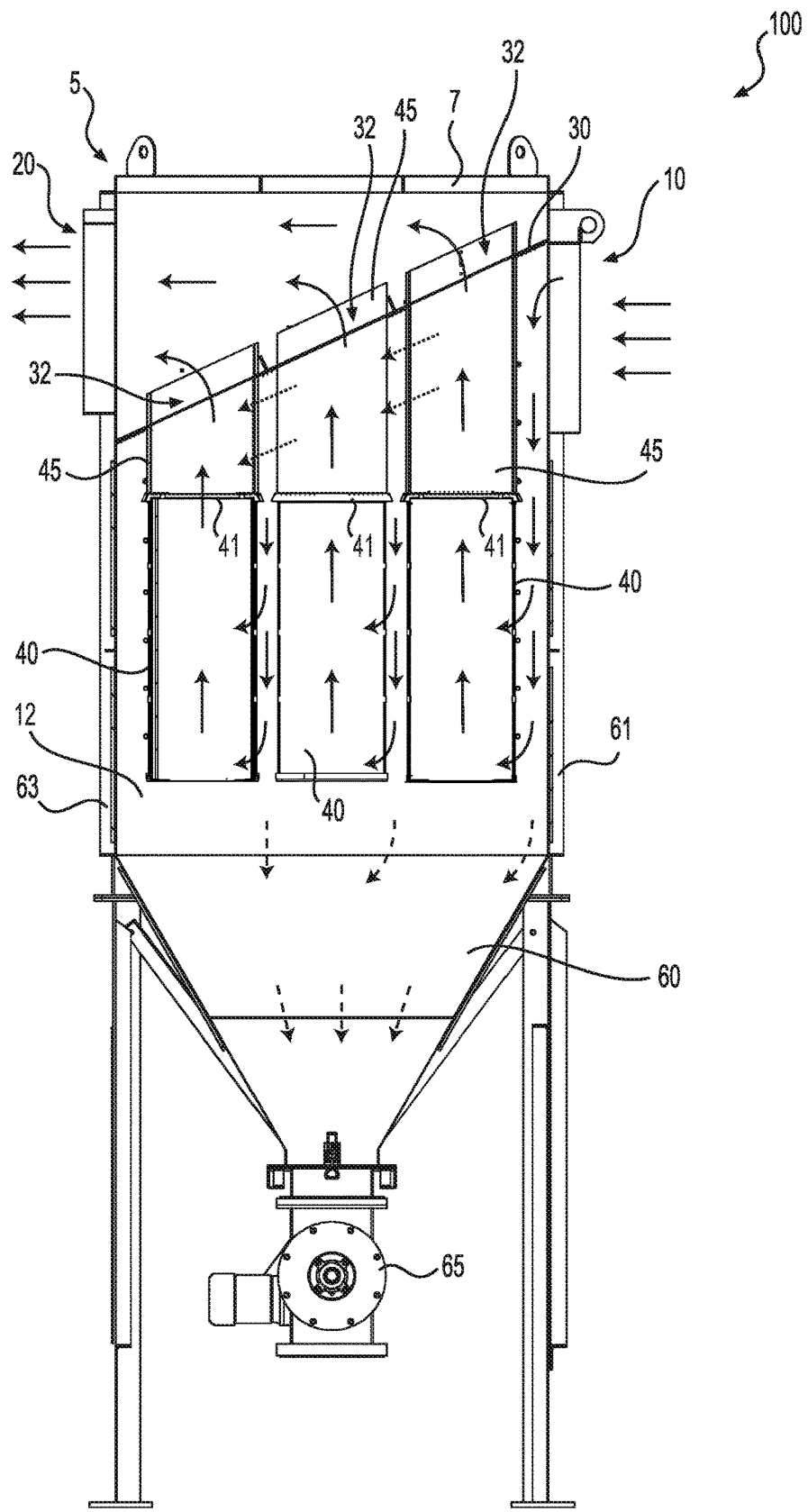
FIG. 2 is a schematic drawing of the air flow directions in the dust collector of FIG. 1.

To better understand the overall air flow path through the dust collector 100, arrows representing the various possible directions of air flow are shown schematically in FIG. 2, superimposed on a simplified cross-section of the dust collector 100 of FIG. 1. A blower or fan (not shown) is operationally connected to the dust collector 100 to induce air flow through the apparatus. It may be external to the dust collector 100, or built into the dust collector 100, depending on the implementation.

Air laden with dust particles enters the dust collector 100 through the inlet 10 in the front wall 61 into the intake chamber 12. As the air and dust enter the intake chamber 12, some will encounter the first row 33 of pipes 45, directing that air generally downward or around the first row 33 of pipes 45. At this point some of the dust may cake onto the surfaces of the pipes 45 facing the inlet 10. As the filters 40 are arranged such that a top portion 41 of each filter 40 is at or below the intake 10, air and dust from the inlet 10 will generally impact the pipes 45 and not directly the filters 40. Some of the air entering the inlet 10 nearer the upper housing wall 7 will encounter the separating plate 30 which will direct the air generally downward as well, due to the diagonal arrangement of the separating plate 30.

Some of the air will pass between the pipes 45 of the first row 33, represented by the dotted arrows. Some of this air will impact the second row 34 of pipes 45, with some of the dust caking onto the pipes 45. Some of the air will be directed downward and some will be directed around the pipes 45 of the second row 34, toward the third row 35 of pipes 45.

As the air flows generally downward and around the pipes 45 and the filters 40, some dust will fall out of the air and fall down into the dust collection unit 60, as represented by the dashed arrows. In order for air to pass from the intake chamber 12 to the exhaust chamber 14, the air and dust particles must pass through one of the filters 40 to arrive to the apertures 32 in the separating plate 30. Dust particles, the exact proportion of which depends on the efficacy of the filter 40 used, will then be trapped in the filter. Air passing through the filters 40 is then referred to as filtered air.

The staggered rows 33, 34, 35 of pipes 45 and the diagonal arrangement of the separating plate 30 direct the incoming air and dust to be distributed generally throughout the intake chamber 12. As such, air passing through the filters 40 in order to exit the intake chamber 12 will be distributed among all the filters 40 throughout the intake chamber 12. As such, filters 40 connected to the pipes 45 of the first row 33 will not necessarily filter more air than the filters 40 connected to the pipes 45 of the second or third rows 34, 35.

An opening allowing the filtered air to exit from the center of the vertically extending filter 40 is located at the top portion 41 of the filter 40, which allows the filtered air to pass into the pipe 45 and flow through the aperture 32 into the exhaust chamber 14. The seals 44 between the pipes 45 and the filters 40 ensure that only filtered air having passed through any filter 40 may enter the pipe 45 and pass through the aperture 32 into the exhaust chamber 14.

The filtered air arrives in the exhaust chamber 14, exiting the apertures 32 at different heights due to the angled arrangement of the separating plate 30. The upper housing wall 7 assists in redirecting the generally upward moving air back to a horizontal motion, allowing the filtered air to then exit the exhaust chamber 14 via the outlet 20 in the back wall 63. The angled top portions of the pipes 45 extending past the separating plate 30, as described above and seen in FIG. 5, also assist in directing the filtered air toward the outlet 20.

Figure 3:
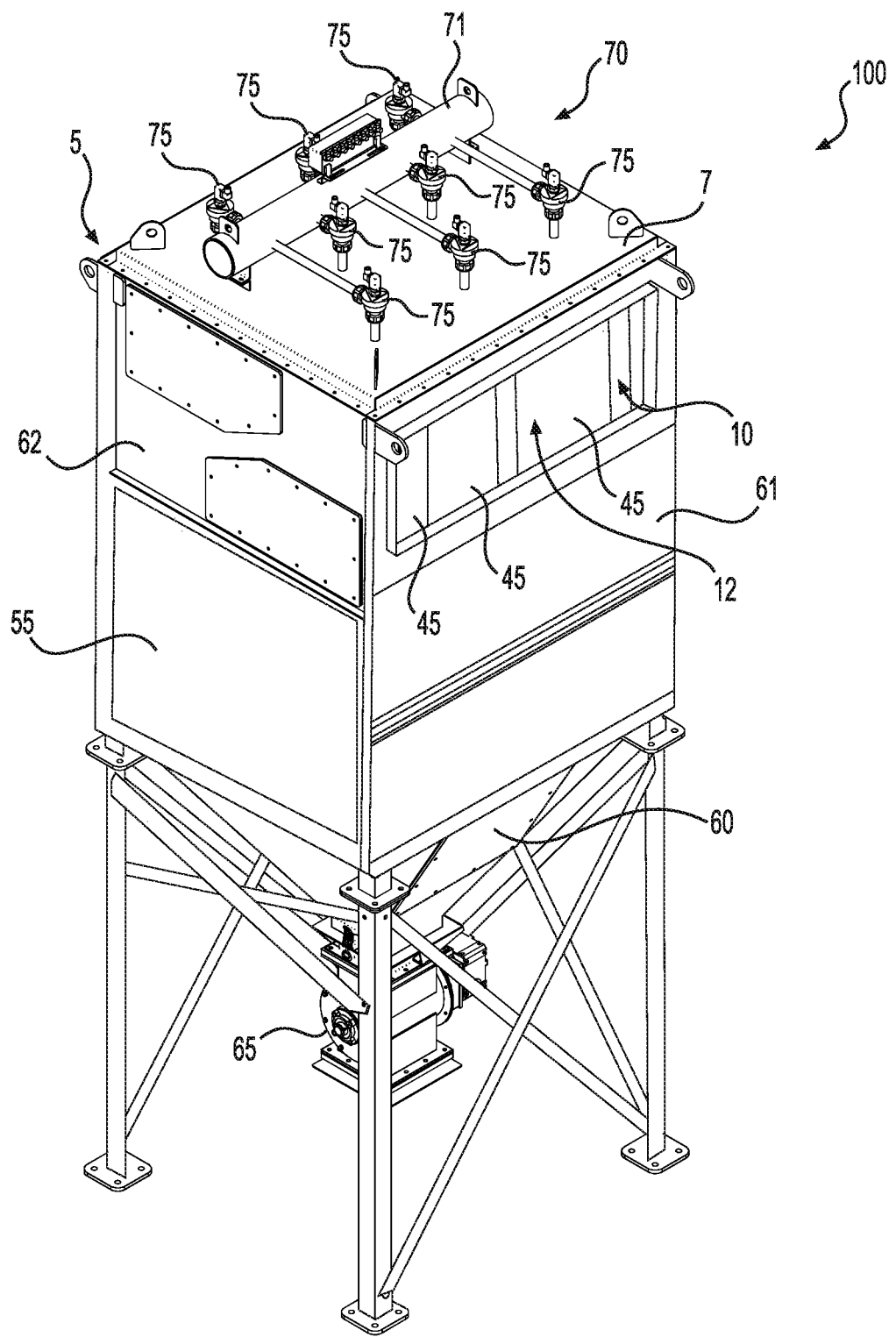
FIG. 3 is a perspective view of the dust collector of FIG. 1.

An air injection system 70, as best seen in FIGS. 1, 3 and 4, is installed on the dust collector 100 to provide a modality to clean a portion of the dust from the filters 40 without having to remove them from the housing 5. A compressed air reservoir 71 supplies compressed air to eight air injection nozzles 75, filled by an air compressor (not shown). Each air injection nozzle 75 is aligned with an aperture 32 to provide compressed air to each pipe 45. When the dust collector 100 is not in operation, an operator can send compressed air from the air injection system 70 through the pipe 45 to each filter 40, the air pushing out through the filter 40 in the opposite direction of the operational air flow. This reverse air flow forces at least some of the dust in the filter 40 back out into the intake chamber 12. The dislodged dust then falls down into the dust collection unit 60. Not every implementation of the dust collector 100 need have an air injection system 70 and it is contemplated that a dust collector 100 according to a different implementation of the present technology may omit the air injection system 70. It is also contemplated that is some implementations there could be fewer air injection nozzles 75 than apertures 32.

Three removable filter systems 201, 202, 203 are provided in the dust collector 100 to enable replacement of the filters 40, which are accessible to an operator through the access door 55 in one of the side walls 62. As systems 201, 202 are similar to 203, only 203 will be described in detail below; various views of the removable filter system 203 are presented in FIGS. 4 and 8 to 11C, which will be referred to concurrently in the description to follow.

Figure 10B:
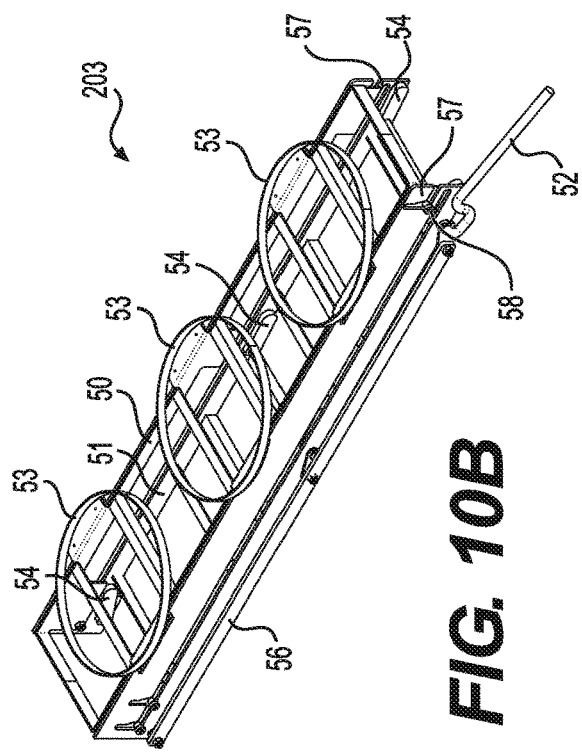
FIG. 10B is an isolated, perspective view of the removable filter system in a lowered position.
Figure 10C:
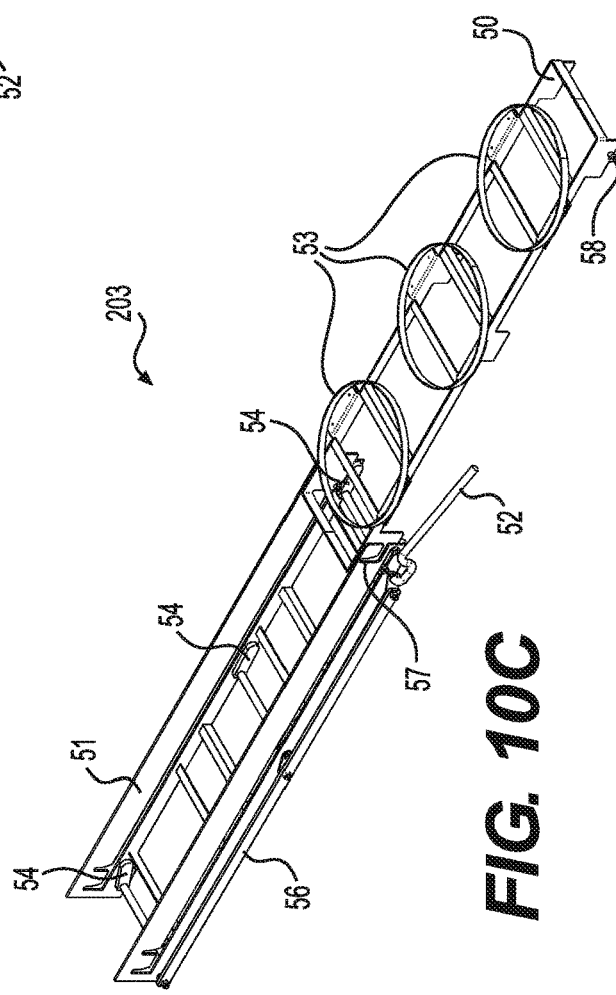
FIG. 10C is an isolated, perspective view of the removable filter system in an extended position.
Figure 10A:
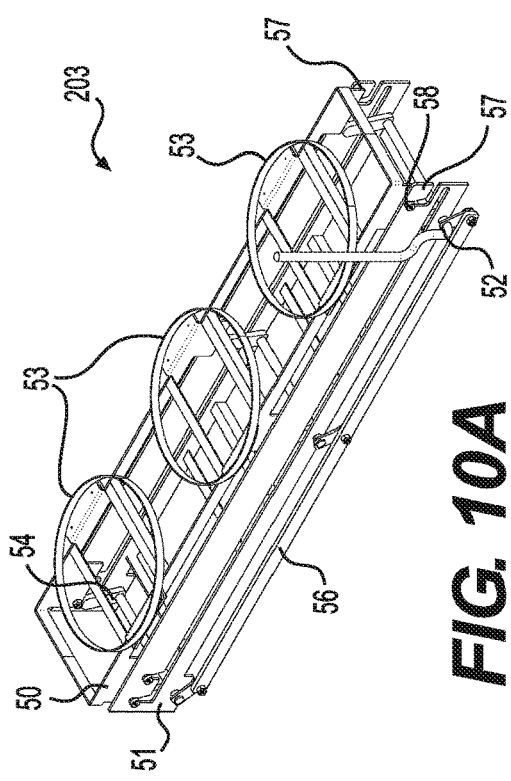
FIG. 10A is an isolated, perspective view of the removable filter system in an operational position.

A removable filter system 203 has a filter carriage 50 movably connected to a carriage base 51, as is seen in FIGS. 10A to 10C. The filter carriage 50 slides horizontally with respect to the carriage base 51, but it is contemplated that the translation mechanism between the filter carriage 50 and the carriage base 51 could include, but is not limited to, rails, wheels, rollers and pistons.

Connected to the top of the filter carriage 50 are three filter supports 53 for holding the filters 40. In this implementation, the filter supports 53 are rings that hold the bottom part of the filters 40, but various mechanisms for supporting the filters 40 are contemplated, including but not limited to: a twist-on mechanism, clips, snaps, and hooks. Depending on the number of filters 40 in a row as arranged in the dust collector 100, the number of filter supports 53 will vary. It is contemplated that as few as one filter support 53 could be included, as well as two, three or more filter supports 53 depending on the implementation.

In order to connect the filters 40 into the bottom flared portions of the pipes 45 such that they are in an operational position, the filter carriage 50, along with the corresponding filter supports 53 and the connected filters 40, is lifted with respect to the carriage base 51, as shown in FIGS. 10A and 11A. In order to slide the filter carriage 50 with respect to the carriage base 51, the filter carriage 50 must be lowered out of the operational position. To do this, three pairs of cams 54 are rotated to lift and lower the filter carriage 50, as can be seen in dashed lines in FIGS. 11A to 11C where three different positions of the filter carriage 50 are displayed. It is contemplated that more or less than three pairs of cams 54 could be used in the raising and lowering mechanism. It is also contemplated that other mechanisms could be used to raise and lower the filter carriage 50 with respect to the carriage base 51.

A lever 52 attached to a relay bar 56 is used to rotate the cams 54. When the lever 52 is substantially vertically aligned, the cams 54 are pulled upright by the relay bar 56. The cams 54 being pulled upright in turn push the filter carriage 50 upward, which is guided into the operational position by a pin 58 of the filter carriage 50 received in a locking slot 57 on each side of the filter carriage 50. In addition, the access door 55 may only be closed when the lever 52 is substantially vertically aligned, such that the filters 40 are ensured to be in an operational position in order for the access door 55 to be closed.

When the lever 52 is moved to a substantially horizontal position, the cams 54 are also turned to a substantially horizontal position by the relay bar 56 which in turn lowers the filter carriage 50 with respect to the carriage base 51, guided again by the locking slot 57, as shown in FIGS. 10B and 11B. In this position, the filters 40 are no longer in an operational position, and the lowered lever 52 blocks the access door 55 from closing. When the removable filter system 203 is installed in a dust collector 100 and in this position, the filter carriage 50 and its corresponding filters 40 are still inside the housing 5 but are ready to be translated out of the dust collector 100, as the filters 40 may pass under the pipes 45 without obstruction.

Figure 8:
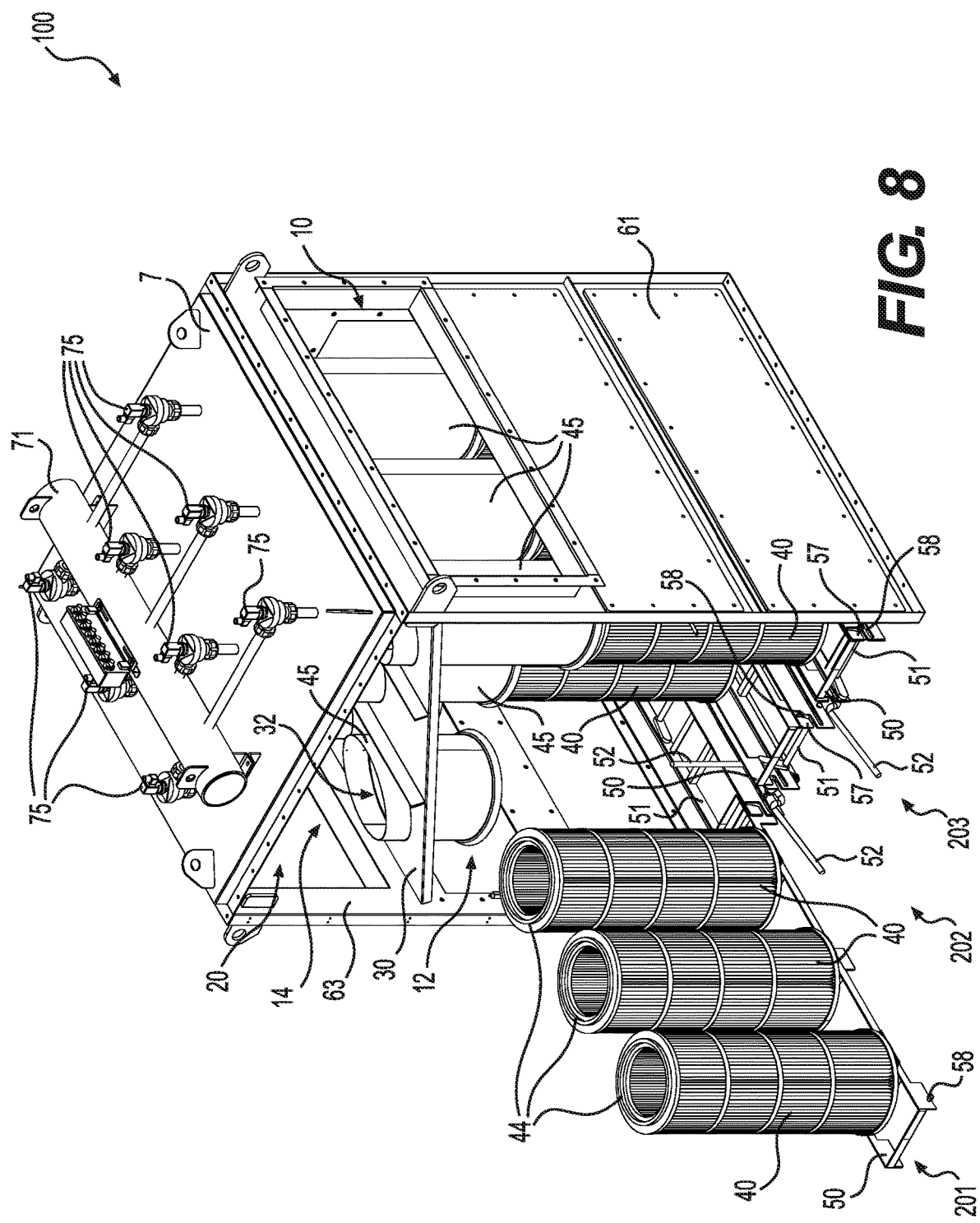
FIG. 8 illustrates an upper part of the dust collector of FIG. 1 with some parts of the housing removed and with the removable filter systems in various positions.
Figure 9:
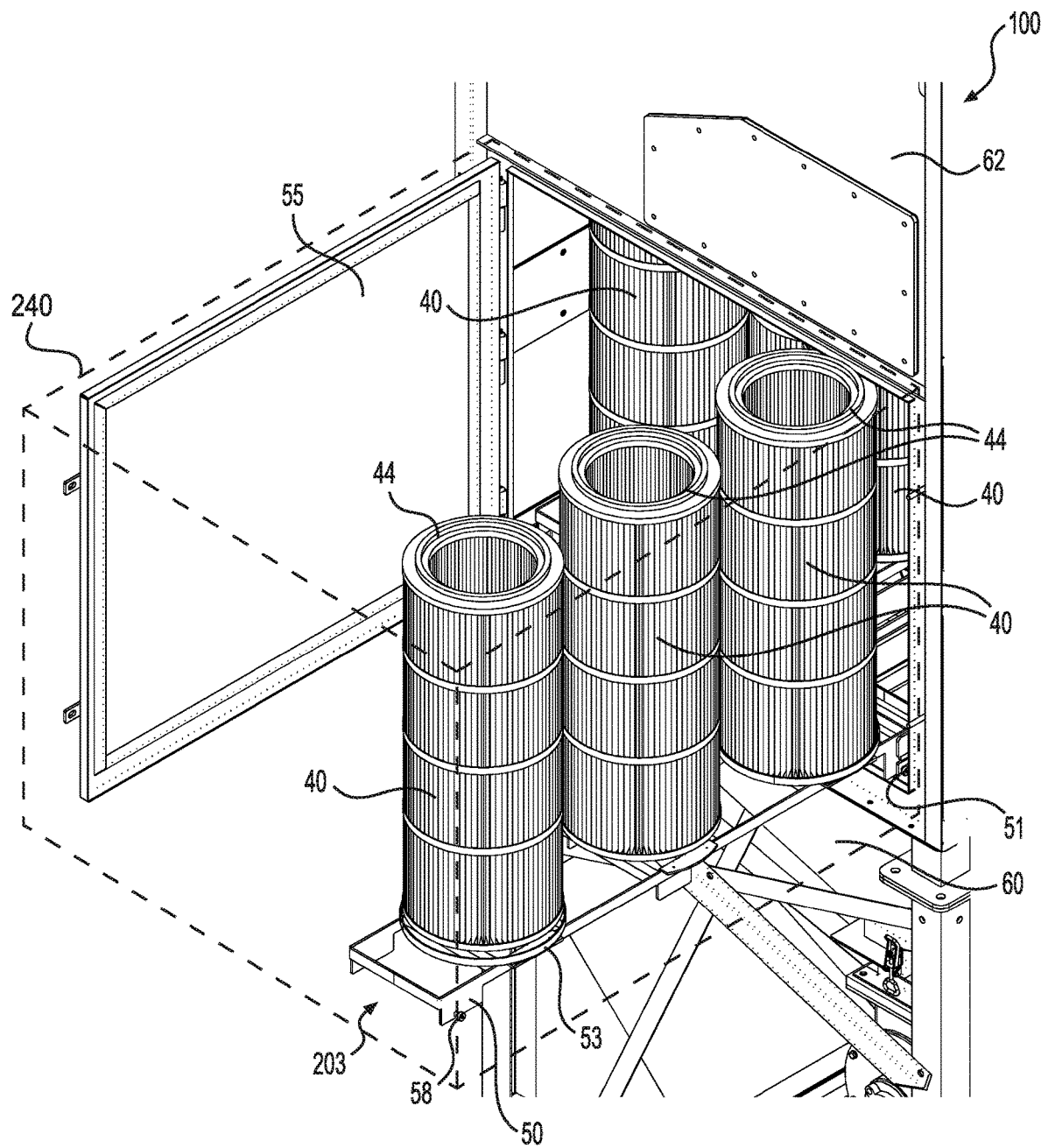
FIG. 9 is another view of the removable filter systems of the dust collector of FIG. 1.

Having lowered the filters 40 with the filter carriage 50, the filter carriage 50 may then be translated horizontally, as shown in FIGS. 10C and 11C. When the removable filter system 203 is installed in a dust collector 100, as seen in FIGS. 8 and 9, translating the filter carriage 50 horizontally in turn translates the filters 40 out of the housing 5. In this position, all the filters 40 on a given filter carriage 50 are accessible and may be removed for cleaning, be repaired, inspected, or replaced with a different filter 40. Other and intermediate positions of the filter carriage 50 are contemplated, depending on the number of filters 40 that the operator desires access to or depending on the specific implementation of the dust collector 100 in which the removable filter system 203 is installed.

A method for replacing a filter 40 in a dust collector 100 will be explained in reference to FIGS. 8 and 9. The method begins by accessing the filter carriage 50 and its attached filter or filters 40. In the dust collector 100, this is done by opening the access door 55. Upon opening the access door 55, the filter carriage 50 will be in the position shown by removable filter system 202, as seen in FIG. 8. The method continues by lowering the filter carriage 50 and its associated filters 40 to a lowered position within the dust collector 100, shown by removable filter system 203 in FIG. 8. The next step is translating the filter carriage 50 with respect to the carriage base 51 out of the dust collector housing 5, along with the associated filters 40. The removable filter system 201, as seen in FIG. 8, has been translated out of the dust collector housing 5. The method continues by removing a filter 40 from the filter support 53 on the filter carriage 50 and placing a different clean filter 40. This different filter 40 could be a new filter, an old filter having been refurbished or cleaned, or even the same filter that had been removed and has now been cleaned. The next step is translating the filter carriage 50 and its associated filters 40 back into the housing 5 of the dust collector 100. The method continues by raising the filter carriage 50 and its associated filters 40 back into an operational location where the top portions 41 of the filters 40 or the seals 44 abut the pipes 45. The access door 55 is then closed and the dust collector 100 is ready for operation.

In some implementations of the method for replacing the filter 40, additional steps may be taken to limit dust from the filter 40 being replaced from falling outside the dust collector 100. As seen in FIG. 9, illustrated in dashed lines, a bag 240 may be connected to the dust collector 100 before opening the access door 55. Shown here as a cubic shaped bag 240, it is contemplated that the bag 240 could take any shape that would allow at least one of the removable filter systems 201, 202, 203 to be translated out of the dust collector 100, as described above. The bag 240 surrounds the access door 55, as illustrated in FIG. 9, but it is also contemplated that the bag 240 could surround only one or more of the removable filter systems 201, 202, 203. An access panel (not shown) may also be present in the bag 240, to allow an operator to move in and out of the bag 240.

Figure 12B:
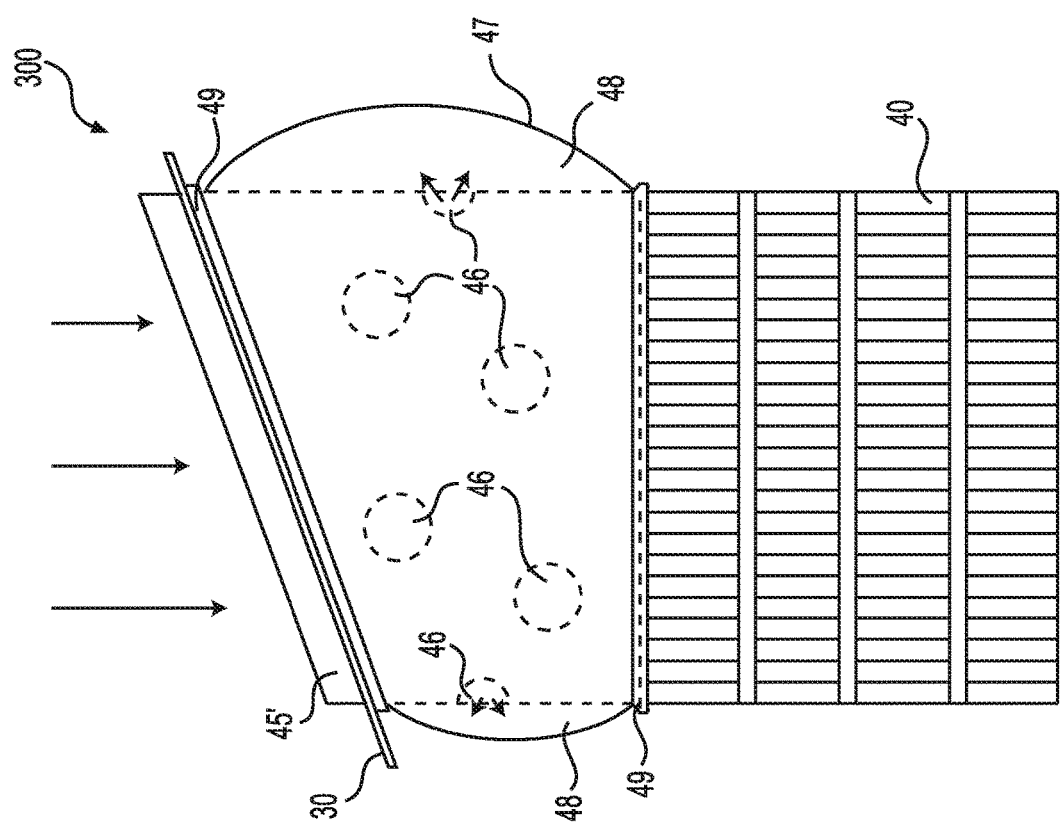
FIG. 12B is a schematic drawing of the filter, pipe and sleeve of FIG. 12A, with the sleeve inflated.
Figure 12A:
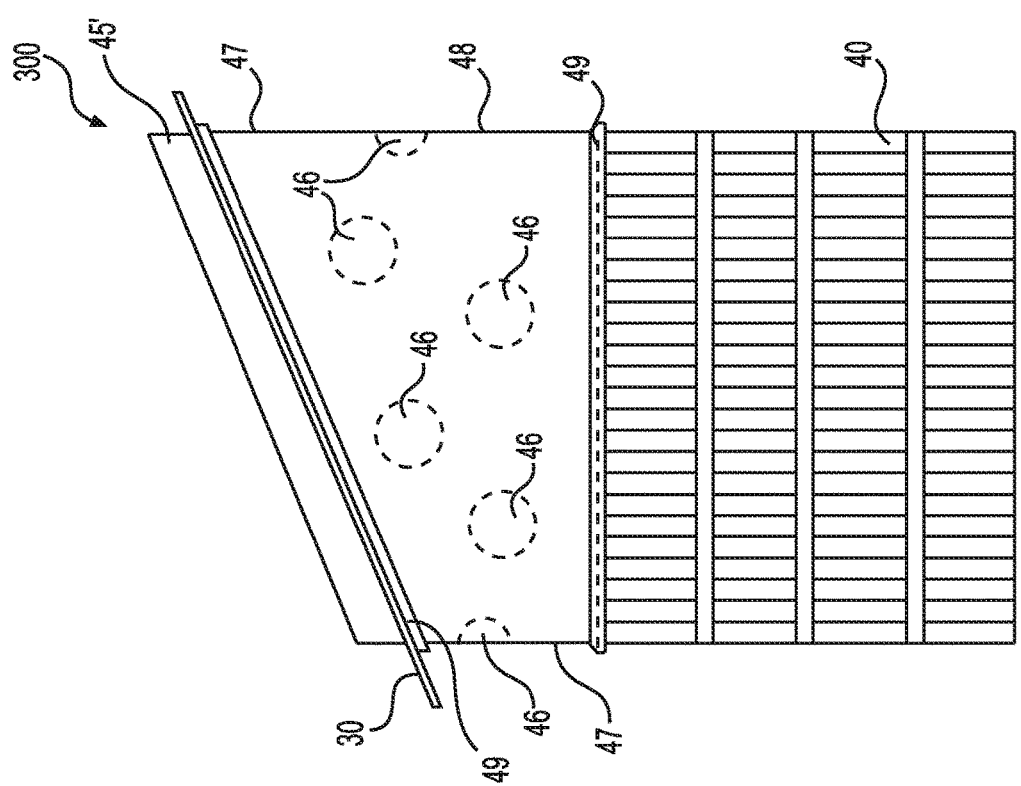
FIG. 12A is a schematic drawing of a filter, pipe and sleeve combination, according to another implementation of the present technology.

Another implementation in accordance with the present technology is shown in FIGS. 12A and 12B. A dust collector similar to that illustrated in FIGS. 1 to 6 has pipes 45' instead of pipes 45 and expandable sleeves 47 around the pipes 45'. These expandable sleeves 47 are held onto the pipes 45' by collars 49 at the top and bottom of the expandable sleeves 47. The pipe 45' has a number of apertures 46 in its sides, shown in dashed lines in FIGS. 12A and 12B to indicate that they are underneath the sleeve 47.

Six apertures 46 in the sides of the pipe 45 are shown, but use of more or less than six apertures 46 is contemplated, including only one aperture 46. It is contemplated that the pipes 45 of the dust collector 100 could be replaced with the pipes 45' with the expandable sleeves 47. The pipes 45' and the expandable sleeves 47 may be used in place of on any number of pipes 45 in the dust collector 100, including all the pipes 45, only the first two rows of pipes 45 or on the first row of pipes 45.

When air from the air injection system 70 is forced into the pipe 45', air flows out of the apertures 46 into a space 48 between the sleeve 47 and the pipe 45'. The air injected into the space 48 increases the size of the space between the sleeve 47 and the pipe 45', inflating the expandable sleeve 47. As described above, air laden with dust particles entering through the inlet 10 of the dust collector 100 would be incident directly on the pipes 45. For a dust collector of this implementation, the air and dust would be incident directly on the sleeve 47 and leave a significant deposit of dust caked upon the sleeve 47 during operation. Upon inflation of the sleeve 47 during a cleaning cycle of the filters 40, also as described above, the dust caked onto the sleeve 47 is accelerated outward or broken up to fall down into the dust collection unit 60.

It is contemplated that the expandable sleeves 47 may be made of any number of materials, depending on the application and the specific implementation, as long as the sleeves 47 can resist chemically to the incoming dust and air, and are expandable under air pressure. It is contemplated that the filters 40 could also be expandable.

A dust collector 300 according to another implementation of the present technology will be described with respect to FIGS. 13 to 15. Elements of the dust collector 300 that are the same as the dust collector 100 retain the same reference numeral.

The dust collector 300 has an extended duct entrance section 315 connected to the housing 5, made up of an inlet 310 and an angled front wall 361. The inlet 310 has a top surface 321 and a bottom surface 320. The top surface 321 of the duct entrance section 315 is oriented at a similar angle to that of the separation plate 30. The bottom surface 320 smoothly joins the front wall 361, as seen in FIG. 13, where the duct bottom surface 320 is curved.

It is contemplated that the duct entrance section 315 could be of different forms, depending on the specific implementation. For example, in some implementations, the top surface 321 could be at any range of angles relative to the separation plate 30, including generally horizontal. It is also contemplated that the bottom surface 320 could be angled, rather than curved, to meet the front wall 61 at a corner.

The walls of the extended duct entrance section 315 are lined with an inflatable membrane 325. The inflatable membrane 325 is inflated using a compressed air line extending from the compressed air reservoir 71 in the air injection system 70. The housing 5 also has four inflatable membranes 326, one each on the front wall 61, the side walls 62 and the back wall 63. The inflatable membranes 326 are illustrated in FIG. 14 by dashed lines to denote that the inflatable membranes 326 are below the separating plate 30. It is contemplated that more or fewer inflatable membranes 326 could be used to cover the interior walls 361, 62 and 63, depending on the specific implementation.

During a cleaning cycle, as described above in relation to FIG. 1 or 12A and 12B, the dust collector 300 can also utilize the inflatable membranes 325, 326 to enhance the cleaning process. As described above, during normal operation dust and particles, especially moist particles, may tend to cake on different elements inside the dust collector 300. This will generally include the duct entrance section 315 and on the walls 361, 62, 63 of the housing 5 of the dust collector 300. The inflatable membranes 325, 326 that line these surfaces will collect the caked on particles. Upon inflation of the inflatable membranes 325, 326 by the compressed air during a cleaning cycle of the filters 40, also as described above, the dust caked onto the inflatable membranes 325, 326 is accelerated outward or broken up to fall down into the dust collection unit 60.

Figure 13:
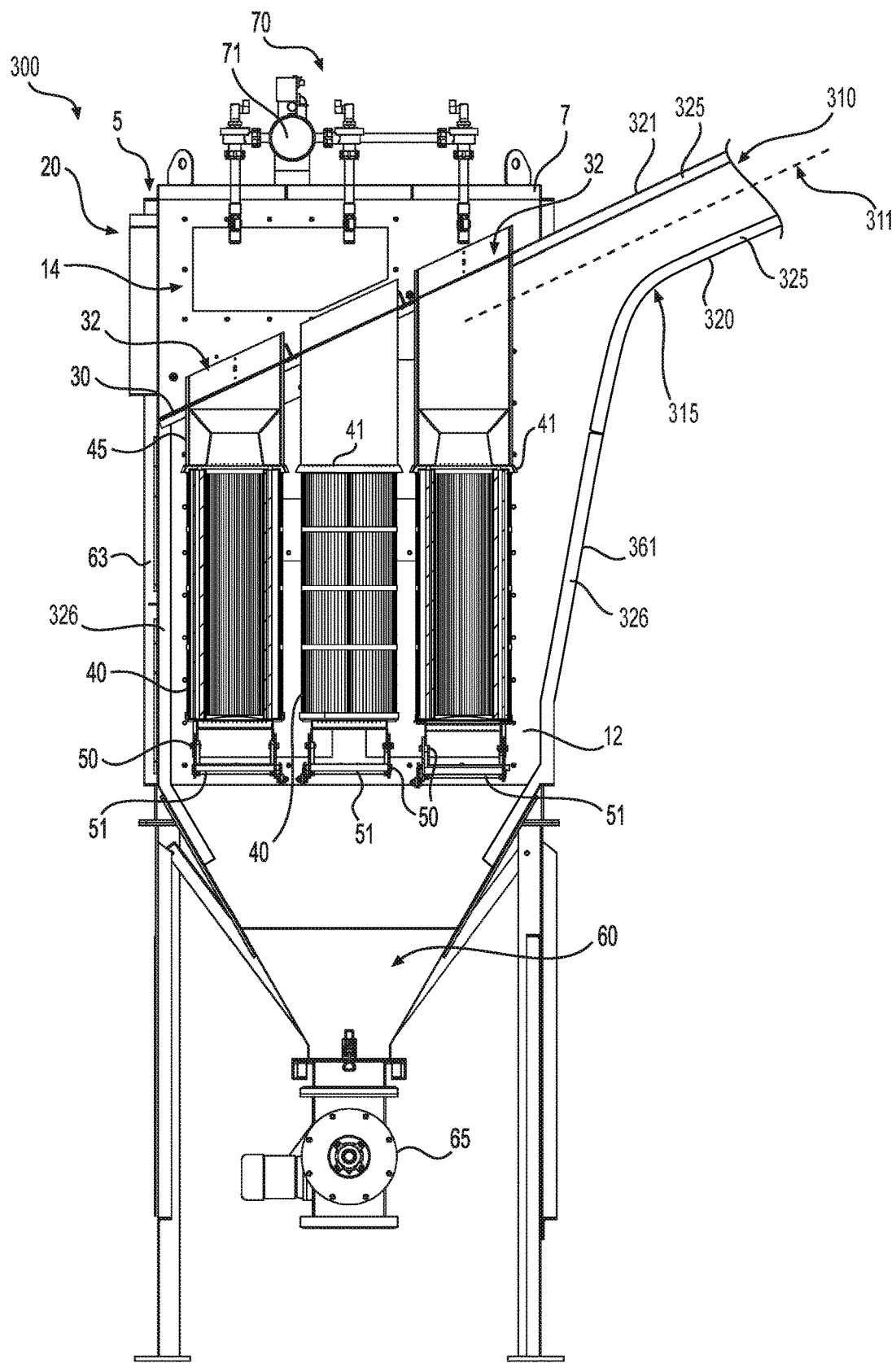
FIG. 13 illustrates a cross-sectional view of a dust collector, according to another implementation of the present technology.
Figure 14:
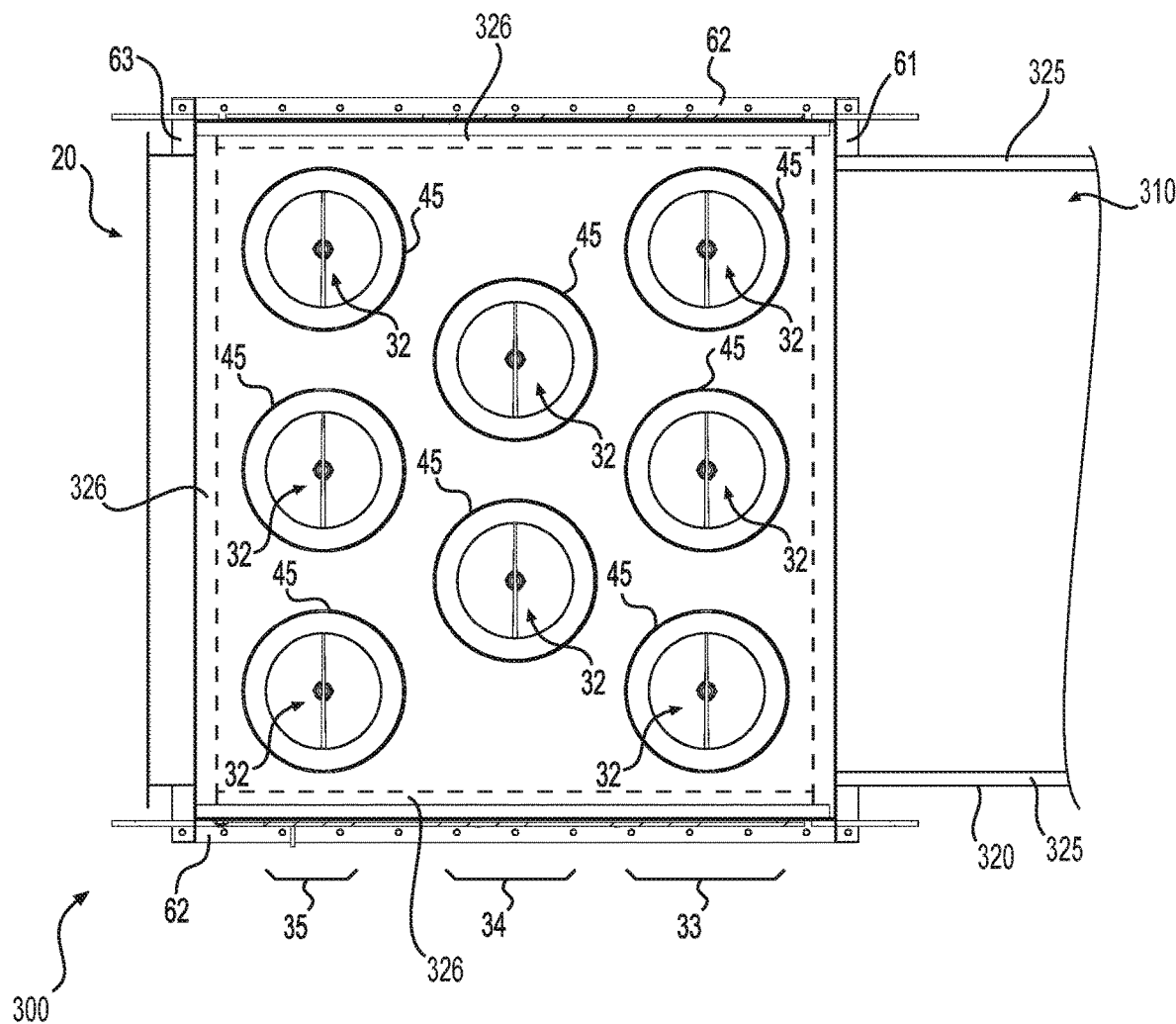
FIG. 14 is a top plan view of the dust collector of FIG. 13 with the upper wall and air injection system removed.
Figure 15:
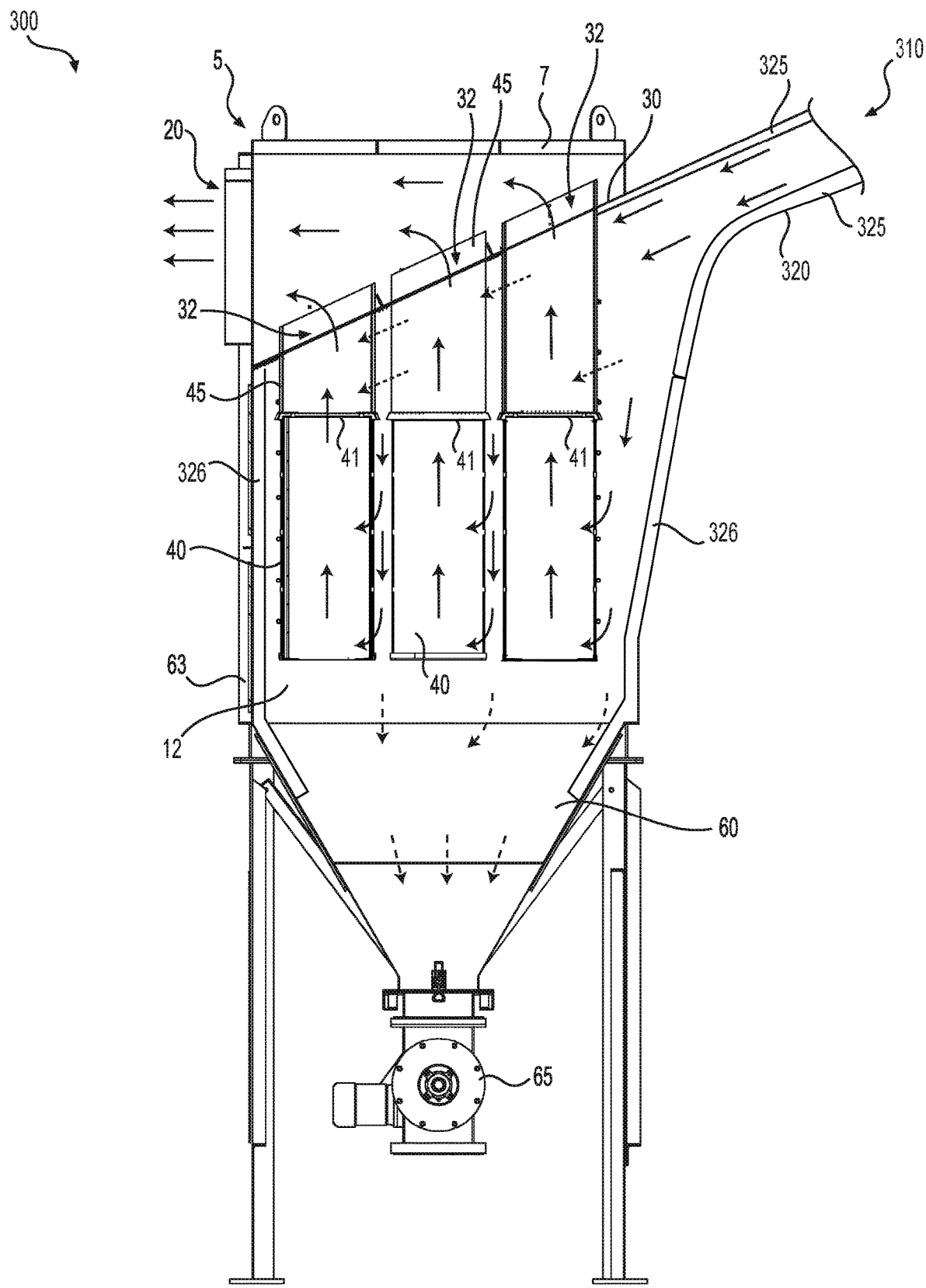
FIG. 15 is a schematic drawing of the air flow directions in the dust collector of FIG. 13.

To better understand the overall air flow path through the dust collector 300, arrows representing the various possible directions of air flow are shown schematically in FIG. 15, superimposed on a simplified cross-section of the dust collector 300 of FIG. 13. A blower or fan (not shown) is operationally connected to the dust collector 300 to induce air flow through the apparatus. It may be external to the dust collector 300, or built into the dust collector 300, depending on the implementation.

Air laden with dust particles enters the dust collector 300 through the inlet 310 of the extended duct entrance section 315 into the intake chamber 12. As illustrated in FIG. 13, a center line 311 of the inlet 310 extends above the top portions 41 of the filters 40, indicating a general path the air and dust take entering the intake chamber 12 from the inlet 310. As the entrance section 315 is angled similarly to the separation plate 30, the air and dust is generally directed into the intake chamber 12 at an angle towards the pipes 45 and filters 40, and not toward the separation plate 30. Some air and dust will encounter the first row 33 of pipes 45, directing that air generally downward or around the first row 33 of pipes 45.

At this point some of the dust may cake onto the surfaces of the pipes 45 facing the extended duct entrance section 310. As the filters 40 are arranged such that a top portion 41 of each filter 40 is at or below the extended duct entrance section 310, air and dust from the extended duct entrance section 310 will generally impact the pipes 45 and not directly the filters 40. While the extended duct entrance section 310 of the dust collector 300 is larger than the inlet 10 of the dust collector 100 described above, the filters 40 are still generally arranged below the entering air and dust.

Some of the air will pass between the pipes 45 of the first row 33, represented by the dotted arrows. Some of this air will impact the second row 34 of pipes 45, with some of the dust caking onto the pipes 45. Some of the air will be directed downward and some will be directed around the pipes 45 of the second row 34, toward the third row 35 of pipes 45.

The staggered rows 33, 34, 35 of pipes 45, the extended duct entrance section 310 arrangement and the diagonal arrangement of the separating plate 30 direct the incoming air and dust to be distributed generally throughout the intake chamber 12. As such, air passing through the filters 40 in order to exit the intake chamber 12 will be distributed among all the filters 40 throughout the intake chamber 12. As such, filters 40 connected to the pipes 45 of the first row 33 will not necessarily filter more air than the filters 40 connected to the pipes 45 of the second or third rows 34, 35.

As described above, the air flows generally downward and around the pipes 45 and the filters 40, some dust falling out of the air and fall down into the dust collection unit 60, as represented by the dashed arrows. In order for air to pass from the intake chamber 12 to the exhaust chamber 14, the air and dust particles must pass through one of the filters 40 to arrive to the apertures 32 in the separating plate 30. Dust particles, the exact proportion of which depends on the efficacy of the filter 40 used, will then be trapped in the filter. Air passing through the filters 40 is then referred to as filtered air. The remaining air flow pattern follows the path described above with respect to FIG. 2.

Modifications and improvements to the above-described implementations of the present invention may become apparent to those skilled in the art. The foregoing description is intended to be exemplary rather than limiting. The scope of the present invention is therefore intended to be limited solely by the scope of the appended claims.

What is claimed is:

1. A method for replacing a filter in a dust collector, the method comprising:
    accessing a filter carriage enclosed by a dust collector housing of the dust collector, a plurality of filters being connected to the filter carriage at a bottom end portion of each filter and being disposed inside the dust collector housing,
    accessing the filter carriage including opening an access door of the dust collector housing,
    a top end portion of each filter engaging a corresponding one of a plurality of pipes disposed in the dust collector housing when in an operational location, each one of the plurality of pipes being arranged for receiving filtered air from a corresponding one of the plurality of filters;
    lowering the filter carriage, each filter being lowered with the filter carriage such that the top end portion of each filter separates from the corresponding pipe, lowering the filter carriage including lowering a lever of the filter carriage from a generally vertical position to a generally horizontal position, the lever blocking the access door from closing when the filter carriage is in a lowered position;
    translating the filter carriage out of the dust collector housing with the plurality of filters, the filter carriage remaining connected to and supported by the dust collector following translation of the filter carriage;
    removing at least one filter of the plurality of filters from the filter carriage;
    placing at least one other filter on the filter carriage;
    translating the filter carriage into the dust collector housing with the at least one other filter;
    raising the filter carriage to lock the at least one other filter into the operational location, raising the filter carriage including lifting the lever from the generally horizontal position to the generally vertical position, the lever no longer blocking the access door from closing when the filter carriage is raised to the operational location; and
    closing the access door, the filter carriage remaining inside the dust collector housing and in a raised position during subsequent operation of the dust collector.

2. The method of claim 1, wherein removing the at least one filter from the filter carriage includes removing the at least one filter from the filter carriage without disconnecting the filter carriage from the dust collector.

3. The method of claim 1, wherein translating the filter carriage out of the dust collector housing comprises translating the filter carriage horizontally out of the dust collector housing.

4. The method of claim 1, wherein:
    the filter carriage is moveably connected to a carriage base disposed in the dust collector housing; and
    translating the filter carriage out of the dust collector housing comprises horizontally sliding the filter carriage with respect to the carriage base.

5. The method of claim 1, wherein raising the filter carriage to lock the at least one other filter into the operational location includes raising the filter carriage such that an upper end of the at least one other filter abuts a corresponding one of the plurality of pipes, the filter carriage being maintained in the raised position in order to maintain the at least one other filter in the operational location.

6. The method of claim 1, wherein lowering the filter carriage causes the top end portion of each filter lowered with the filter carriage to separate from the corresponding pipe.

* * * * *